(12) United States Patent
Kawase et al.

(10) Patent No.: US 6,712,525 B1
(45) Date of Patent: Mar. 30, 2004

(54) OPTICAL CONNECTING COMPONENT

(75) Inventors: Ritsu Kawase, Shizuoka (JP); Kyoichi Sasaki, Shizuoka (JP); Ken Sukegawa, Shizuoka (JP); Tatsushi Kobayashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 10/070,779

(22) PCT Filed: Nov. 11, 1999

(86) PCT No.: PCT/JP99/06274

§ 371 (c)(1), (2), (4) Date: May 9, 2001

(87) PCT Pub. No.: WO00/28356

PCT Pub. Date: May 18, 2000

(30) Foreign Application Priority Data

Nov. 11, 1998 (JP) .............................. 10-320639
Jan. 13, 1999 (JP) ................................. 11-6435
Feb. 12, 1999 (JP) ............................... 11-33573

(51) Int. Cl.$^7$ .............................. G02B 6/38; G02B 6/36; B05D 1/36; B05D 7/00; B29C 65/00
(52) U.S. Cl. ........................ 385/76; 385/59; 427/407.2; 156/285
(58) Field of Search .............................. 385/59, 79, 76; 427/407.2; 156/285

(56) References Cited

U.S. PATENT DOCUMENTS

| | | | |
|---|---|---|---|
| 4,546,018 A | * 10/1985 | Ryuzo et al. | ............ 427/407.2 |
| 5,204,925 A | 4/1993 | Bonanni et al. | |
| 5,259,051 A | * 11/1993 | Burack et al. | ................. 385/76 |
| 5,292,390 A | 3/1994 | Burack et al. | |
| 5,539,013 A | * 7/1996 | Eckberg et al. | ................. 522/75 |
| 5,582,673 A | * 12/1996 | Burack et al. | ............... 156/285 |
| 5,832,149 A | * 11/1998 | Omizu et al. | .................. 385/20 |
| 6,151,433 A | * 11/2000 | Dower et al. | .................. 385/86 |

FOREIGN PATENT DOCUMENTS

| | | |
|---|---|---|
| JP | 39058/1979 | 3/1979 |
| JP | 62-8011 | 2/1987 |
| JP | 2574611 | 10/1995 |
| JP | 11-119033 | 4/1999 |

\* cited by examiner

*Primary Examiner*—John D. Lee
*Assistant Examiner*—Tina M Lin
(74) *Attorney, Agent, or Firm*—McDermott, Will & Emery

(57) ABSTRACT

An optical inter-connection apparatus according to this invention has plural optical fibers 4, which are routed in a two-dimensional plane and are provided at opposite ends thereof with end portions 5 adapted to permit optical inter-connections thereto, and at least one protective resin layer 2 by which the optical fibers are held in place. The protective resin layer 2 is formed from a silicone-base material curable through a condensation reaction with liberation of an oxime or liberation of an alcohol or from a silicone-base material, which is curable by crosslinking through a hydrosilation reaction, and an adhesion promoter, and is joined with a base 1 or another protective resin layer via an adhesive layer 3. The adhesive layer comprises an acrylic pressure-sensitive adhesive. As an alternative, the adhesive layer may comprise a silicone-base pressure-sensitive adhesive which is curable by crosslinking through a hydrosilation reaction.

18 Claims, 3 Drawing Sheets

OPTICAL CONNECTING COMPONENT

TECHNICAL FIELD

This invention relates to optical interconnection apparatuses (optical circuit boards) for mutually connecting optical elements, components and/or devices used in optical communications or optical information processing, such as optical elements, optical circuit packages and optical circuit devices.

BACKGROUND ART

To permit interconnections between plural optical elements in an optical circuit package or optical interconnections between plural optical circuit packages or between optical circuit devices on each of which optical packages are mounted, these optical elements, optical circuit packages and optical circuit devices are generally provided at terminals thereof with optical connectors to interconnect them together via optical fibers. As these optical fibers have to be arranged with loose in this case, it is a current circumstance that, on an optical circuit package or inside and/or on a back side of an optical circuit devices, intricately routed lines of the optical fibers extend overlapping one another in the form of a bird's nest and hence occupy a large space. For an optical interconnection process which requires a large space and considerable interconnecting labor due to such complex routing, a simple process has been proposed to solve these, problems by routing optical fibers on a two-dimensional planar surface as desired. As disclosed in JP 2,574,611 B, for example, an optical interconnection apparatus which uses a sheet or base with a pressure-sensitive adhesive coated thereon to hold optical fibers in place has been proposed.

Incidentally, the optical interconnection apparatus disclosed in JP 2,574,611 B is obtained in such a way that upon its fabrication, optical fibers are located by a pressure-sensitive adhesive on a base (base layer) or fiber jackets to form a routing pattern and the routing pattern is then covered with a material similar to a material used for the base, whereby a protective layer is formed. This process is however accompanied by problems in that as optical fibers so located increase in number and the optical fibers increase more overlapped portions (cross-over routing) in the routing pattern so formed, the resulting routing layer of the optical fibers becomes thicker and, because the tacky surface with which the optical fibers are in contact becomes smaller at the overlapped portions of the optical fibers, the protective layer cannot be arranged evenly. There is a further problem in that at the overlapped portions of the optical fibers in the routing pattern, the fixing force by the pressure-sensitive adhesive becomes weaker and the optical fibers are allowed to move, thereby resulting in displacements in the routing pattern (a loss in the intactness of the routing pattern). Moreover, general optical fibers range from 125 to 250 µm in diameter so that at an overlapped area of three optical fibers, for example, the routing layer of the optical fibers becomes as thick as 375 to 750 µm. An increase in the overlapped portions of optical fibers in a routing pattern develops lifted portions (air pockets) in a lower part of a protective layer around optical fibers, so that a problem arises in the reliability against temperatures and humidities and in addition, the optical circuit board becomes extremely weak to breakage which may be caused by deformation such as bending.

To solve these problems, it is studied to hold optical fibers, which are routed overlapping one another on an adhesive layer, in place by forming a protective resin layer over the optical fibers. In this case, however, combined use of a most commonly-employed acrylic pressure-sensitive adhesive as the adhesive layer and a silicone-base material, which is generally employed as a sealant in the field of semiconductors or the like, in the protective resin layer involves a problem in the adhesion with the acrylic pressure-sensitive adhesive material, which is a plastic material, because of good release properties of the silicone material, although this combined use is excellent in reliability, stress relaxation, heat resistance, freeze resistance, moisture resistance, chemical resistance, dust resistance and electrical insulation property owing to the characteristics of these materials. An optical circuit board so fabricated is therefore prone to breakage such as separation by deformation such as bending. As a result, insufficiency arises in holding optical fibers in place, resulting in development of a further problem in that the optical fibers undergo displacements in the routing pattern (a lose in the intactness of the routing pattern).

The present invention has been completed with a view to solving such problems in the conventional art. An object of the present invention is, therefore, to provide a novel optical interconnection apparatus, which can hold in place and protect routed optical fibers against external force (pulling, bending, scratching and the like), permits easy optical inter-connections without a loss in the intactness of a routing pattern of the optical fibers routed overlapping one another as described above, and is excellent in reliability such as environmental resistance—such as heat resistance and freeze resistance—and firm adhesion to a protective resin layer.

DISCLOSURE OF THE INVENTION

Each optical interconnection apparatus according to the present invention has plural optical fibers, which are routed in a two-dimensional plane and are provided at opposite ends thereof with end portions adapted to permit optical interconnections thereto, and at least one protective resin layer by which said optical fibers are held in place. In a first aspect, an optical interconnection apparatus is characterized in that the protective resin layer is formed from a silicone-base material curable through a condensation reaction with liberation of an oxime or liberation of an alcohol, is joined with a base or another protective resin layer via an adhesive layer, and the adhesive layer comprises an acrylic pressure-sensitive adhesive. In a second aspect, an optical interconnection apparatus is characterized in that the protective resin layer is formed from a silicone-base material curable by crosslinking through a hydrosilation reaction and an adhesive promoter, is joined with a base or another protective resin layer via an adhesive layer, and the adhesive layer comprises an acrylic pressure-sensitive adhesive. Further, in a third aspect, an optical interconnection apparatus is characterized in that the protective resin layer is formed of a silicone-base material, is joined with a base or another protective resin layer via an adhesive layer, and the adhesive layer comprises a silicone-base pressure-sensitive adhesive curable by crosslinking through a hydrosilation reaction.

In each of these optical interconnection apparatus according to the present invention, protective resin layers by which optical fibers are held in place, respectively, may be joined to opposite sides of the base via adhesive layers, respectively. As an alternative, another protective resin layer may be arranged on a back side of the base. As a further alternative, plural protective resin layers by which optical fibers are held in place, respectively, may be joined together via the adhesive layer.

In an optical interconnection apparatus according to a still further aspect, plural optical interconnection apparatuses as described above are joined together via an adhesive layer formed of a silicone-base pressure-sensitive adhesive, whereby a stacked structure is formed.

BEST MODES FOR CARRYING OUT THE INVENTION

Figure 1:
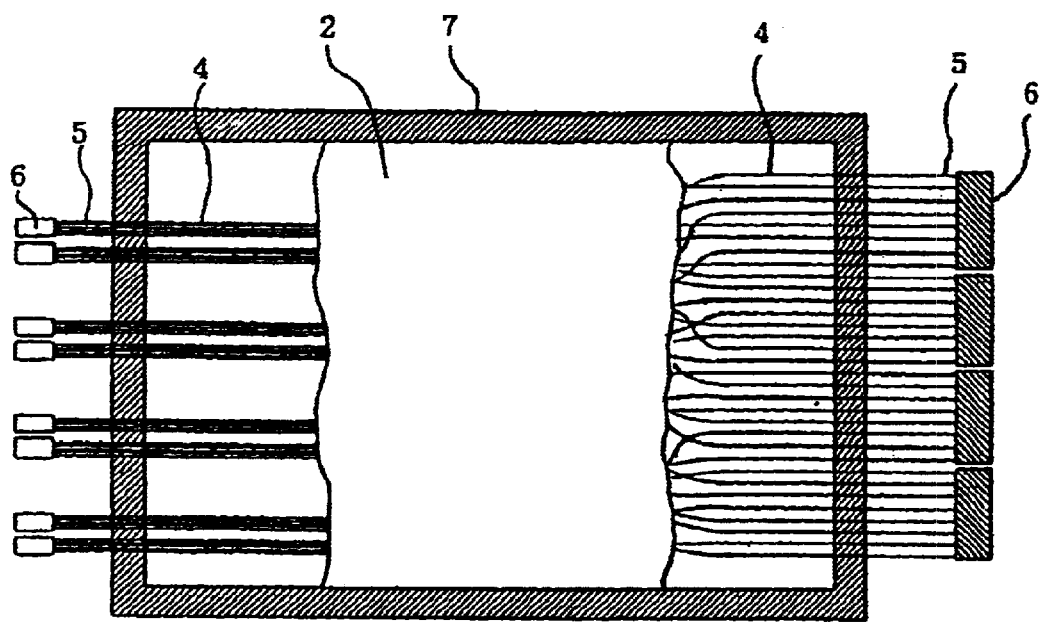
FIG. 1 is a partly cut-away top plan view of an illustrative optical interconnection apparatus according to the present invention.

The optical interconnection apparatuses according to the first and second aspects of the present invention can each be fabricated by coating the acrylic pressure-sensitive adhesive on one side of a flexible base, which has two-dimensional planar surfaces, to form the adhesive layer, routing the plural optical fibers on the adhesive layer such that the optical fibers are provided at the ends thereof with the end portions adapted to permit optical interconnections, and then coating and curing the silicone-base material, which cures through the condensation reaction with liberation of the oxime or alcohol, or a coating material of silicone-base material to the silicone-base material curable by crosslinking through the hydrosilation reaction, which has been obtained by adding the adhesive promoter to form the protective resin layer. On the other side of the base, a silicone-base material of the same type as the above-described one or another material, which can form flexible coating, may be coated to form a protective resin layer. As a further alternative, adhesive layers as described above may be formed on both sides of the base, respectively, followed by the routing of optical fibers and the formation of protective resin layers.

The optical interconnection apparatus according to the third aspect of the present invention can be fabricated by coating the silicone-base pressure-sensitive adhesive (hereinafter called the "addition reaction-type silicone-base pressure-sensitive adhesives"), which cures by crosslinking through the hydrosilation reaction, on one side of a base, which has two-dimensional planar surfaces, to form the adhesive layer, routing the plural optical fibers on the adhesive layer such that the optical fibers are provided at the ends thereof with the end portions adapted to permit optical interconnections, and then forming the protective resin layer with the silicone-base material such that the routed optical fibers are held in place. The protective resin layer may be formed by filling a silicone-base material inside an edge dam member arranged along or in a vicinity of a peripheral edge of the base or another protective resin layer. On the other side of the base, a material of the same type as the above-described one or another material, which can form flexible coating, may be coated to form a protective resin layer. As a still further alternative, adhesive layers formed of the addition reaction-type silicone-base pressure-sensitive adhesive may be formed on both sides of the base, respectively, followed by the routing of optical fibers and the formation of protective resin layers.

An optical interconnection apparatus which has no base can be fabricated by using a release film as a temporary base. Described specifically, after formation of an adhesive layer on one side of the release film, routing of optical fibers and the formation of a protective resin layer as described above, the release film is removed. On the exposed adhesive layer, optical fibers, if needed, are routed and a protective resin layer is formed, as described above. It is also possible to form an adhesive layer on the thus-formed protective resin layer, to route optical fibers and then to form a protective resin as described above. By repeating these procedures, it is possible to fabricate an optical interconnection apparatus in which many protective resin layers with optical fibers held in place thereon are joined together via adhesive layers, respectively.

In addition, an optical interconnection apparatus which includes plural bases can also be fabricated by adhering plural optical interconnection apparatuses, each of which includes a single base and has been fabricated as described above, at protective resin layers thereof into a stacked structure by using a silicone-base pressure-sensitive adhesive.

Referring to the drawings, embodiments of the present invention will hereinafter be described in detail.

Figure 2:
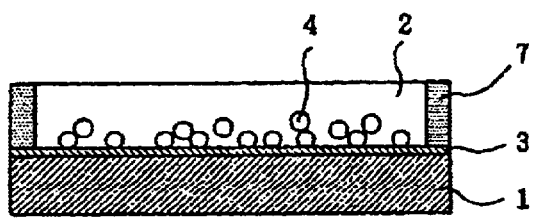
FIG. 2 is a cross-sectional view of the optical interconnection apparatus of FIG. 1, and FIG. 3 through FIG. 10 are cross-sectional views of optical interconnection apparatuses according to the present invention, respectively.
Figure 3:
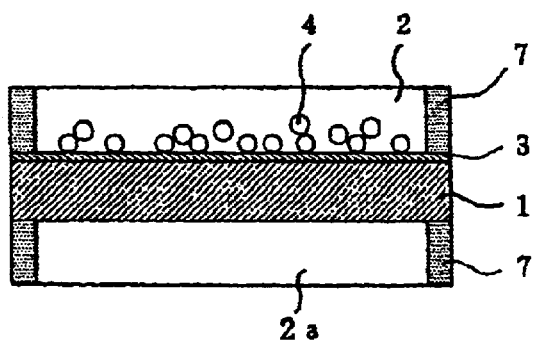
Figure 4:
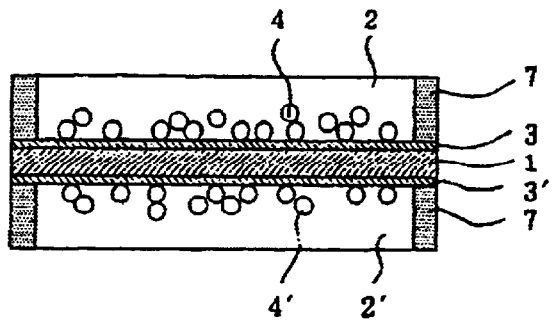
Figure 5:
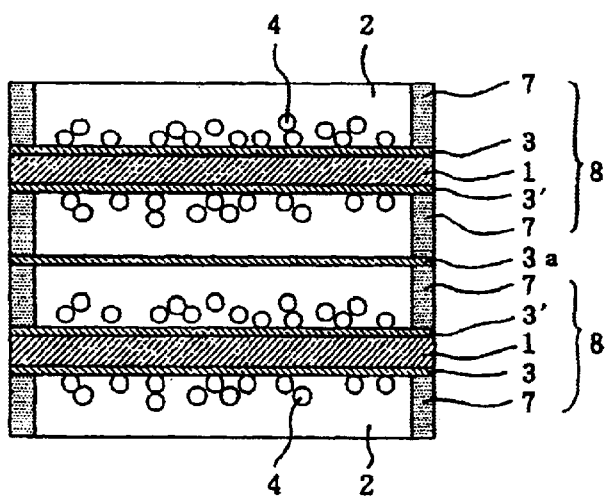
Figure 6:
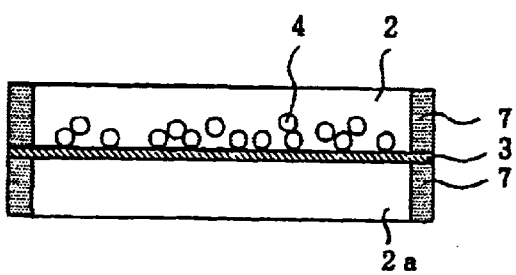
Figure 7:
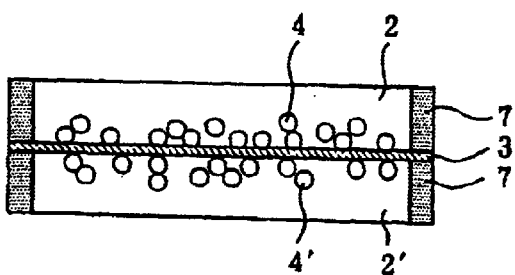
Figure 8:
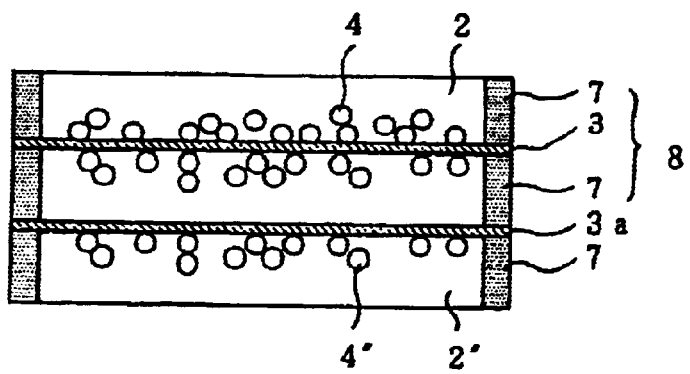

FIG. 1 is a partly cut-away top plan view of an illustrative optical interconnection apparatus according to an embodiment of the present invention, and FIG. 2 is its cross-sectional view. FIG. 3 through FIG. 5 are cross-sectional views of other illustrative optical interconnection apparatuses which make use of base films, respectively, and FIG. 6 through FIG. 8 are cross-sectional views of illustrative optical interconnection apparatuses which has no base film. In FIGS. 1 and 2, plural optical fibers 4 are routed in a two-dimensional plane via an adhesive layer 3 on one side of a flexible base film 1 which has two-dimensional planar surfaces. Opposite ends of these optical fibers 4 are formed into end portions 5 adapted to permit optical interconnections. Optical components 6, for example, optical connectors are interconnected to the end portions. Incidentally, the end portions 5 and the optical components 6 may be integrated. Designated at numeral 7 is an edge-dam arranged to form a protective resin layer.

The optical interconnection apparatus of FIG. 3 illustrates a case that the base film 1 in FIG. 2 is provided on the other side thereof with a protective resin layer 2a made of the same material as or a material different from the resin material of the protective resin layer and having flexibility. In FIG. 4, plural optical fibers 4' are routed in a two-dimensional plane on the other side of the base film 1 of FIG. 2 via another adhesive layer 3', and these optical fibers 4' are held in place by a protective resin layer 2' having flexibility. Further, the optical interconnection apparatus of FIG. 5 is of a structure that optical interconnection apparatuses 8, 8 as shown in FIG. 4 joined together by an adhesive layer 3a, whereby a stacked structure having four protective resin layers and two base films is formed.

Figure 9:
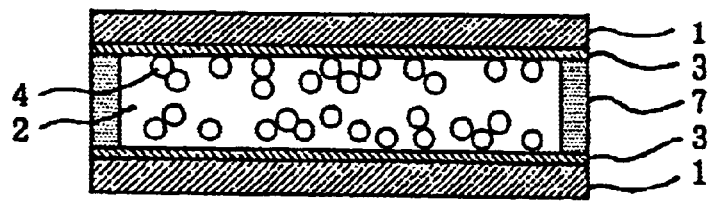
Figure 10:
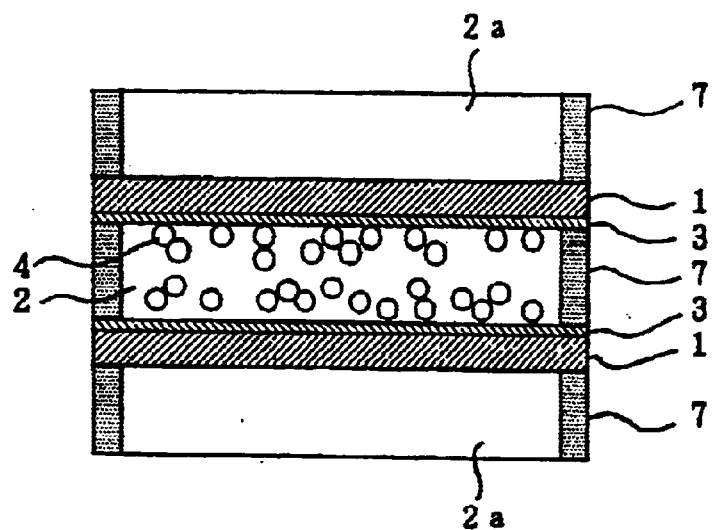

The optical interconnection apparatus of FIG. 6 shows one of a structure that a protective resin layer 2 in which optical fibers are held in place is joined with another protective resin layer 2a via an adhesive layer 3. Further, the optical interconnection apparatus of FIG. 7 is of a structure that a protective resin layer 2, in which optical fibers 4 are held in place, and another protective resin layer 2', in which optical fibers 4' are held in place, are joined together via an adhesive layer 3. The optical interconnection apparatus of FIG. 8 is of a structure that to the optical interconnection apparatus 8 of FIG. 7, a still further protective resin layer 2" in which optical fibers 4" are held in place is joined further via an adhesive layer 3a, and a stacked structure composed of three protective resin layers is formed. The optical interconnection apparatus of FIG. 9 depicts a structure in which on the protective resin layer of FIG. 2, a base film 1 with optical fibers routed thereon is arranged to form the optical interconnection apparatus. In addition, FIG. 10 shows a case in which on the other side of the base film 1 in FIG. 9, a protective resin layer 2a is arranged to form the optical interconnection apparatus.

In each optical interconnection apparatus according to the present invention, no particular limitation is imposed on the base film for supporting the routed optical fibers although a flexible base film having a two-dimensional plane is used in general. Illustrative of the base film can include glass-epoxy resin composite bases, polyester films, polyimide films, and gel-form bases, rubbery bases and foam-like bases of organic materials as silicone or urethane rubber or foam. Any bases are usable insofar as they are employed in general electronic components or electrical components. It is to be noted that depending on the application purpose, the optical interconnection apparatus according to the present invention is not required to be flexible but may be stiff. It is, therefore, possible to use a base made of a stiff high-molecular material, a ceramic base, or the like. Further, the base may be of any shape. Particularly suited from the view point of heat resistance are bases having good heat resistance such as glass-epoxy resin composite bases, polyimide films, and silicone or urethane rubber or foam, and ceramic bases.

Optical fibers, which are to be routed in the present invention, can be suitably selected and used depending on the application purpose of the optical interconnection apparatus. For example, silica-or plastic-made single-mode optical fibers, multiple-mode optical fibers or the like can be used preferably. It is also preferred to use carbon-coated optical fibers. As major factors which generally govern the service life of optical fibers, intrusion of water and hydrogen from the surrounding atmosphere can be mentioned. Carbon-coated optical fibers can minimize intrusion of water and hydrogen so that they can provide high reliability and long service life. Different from general optical cables, the optical interconnection apparatus according to the present invention is not provided with a cable sheath which provides high environmental resistance. It is therefore more effective to use carbon-coated optical fibers for their high reliability.

As a method for routing optical fibers in a two-dimensional plane in the present invention, it is most convenient to route them by arranging an adhesive layer on a base film. To fabricate an optical interconnection apparatus which has no base film, however, a release film may be temporarily used as a base film or a film having flexibility sufficient to serve as a protective resin layer and carrying an adhesive layer thereon may be employed.

As an adhesive for forming adhesive layers to route optical fibers, an acrylic pressure-sensitive adhesive is used in the optical interconnection apparatuses according to the first and second aspects. Any acrylic pressure-sensitive adhesive can be used insofar as it has adhesiveness sufficient to retain the pattern of the optical fibers against tensions which may be produced when the routed optical fibers are bent. In general, an acrylic pressure-sensitive adhesive is formed of an acrylic resin, and as its component, a copolymer composed of an acrylic monomer as a principal component, one or more other comonomer components and a small proportion of a functional-group-containing monomer component is used. Such a copolymer can be synthesized by conducting radical polymerization in an organic solvent, for example, an aromatic hydrocarbon such as toluene or xylene, an ester such as ethyl acetate or butyl acetate, or a ketone such as methyl ethyl ketone, methyl isobutyl ketone or cyclohexanone or by subjecting an emulsified water dispersion to emulsion polymerization in the presence of an emulsifier. The synthesized acrylic pressure-sensitive adhesive may be used in combination with a curing agent as needed, although it can be used singly. Depending on the application purpose, it is also possible to add a tackifier such as rosin ester or $C_9$ petroleum resin and/or a pigment such as titanium oxide.

Examples of the primary monomer component, which forms the acrylic pressure-sensitive adhesive, can include alkyl esters of acrylic acid having carbon atoms of 2 or more, such as ethyl acrylate, n-butyl acrylate, isobutyl acrylate, 2-ethylhexyl acrylate, lauryl acrylate, and benzyl acrylate; and alkyl esters of methacrylic acid having carbon atoms of 4 or more, such as n-butyl methacrylate, isobutyl methacrylate, 2-ethylhexyl methacrylate, lauryl methacrylate, and benzyl methacrylate.

Examples of the comonomers copolymerizable with these alkyl acrylates or alkyl methacrylates can include methyl acrylate; alkyl esters of methacrylic acid having carbon atoms of 3 or less, such as methyl methacrylate, ethyl methacrylate and propyl methacrylate; vinyl acetate; acrylonitrile; methacrylonitrile; acrylamide; and styrene.

Examples of monomers having functional group can include monocarboxylic acids such as acrylic acid and methacrylic acid; polycarboxylic acids such as maleic acid, fumaric acid, citraconic acid, glutaconic acid, itaconic acid and these acid anhydrides; monomers having hydroxyl group such as 2-hydroxyethyl acrylate (or methacrylate), 2-hydroxypropyl acrylate (or methacrylate), 3-chlora-2-hydroxypropyl acrylate (or methacrylate), diethylene glycol mono-acrylate (or methacrylate), N-methylolacrylamide and N-methyrol-methacrylamide; and monomers having amino group such as dimethylaminoethyl methacrylate, t-butylaminoethyl methacrylate and acrylamide.

Examples of the curing agent can include isocyanate compounds such as tolylene diisocyanate, hydrogenated tolylene diisocyanate, a tolylene diisocyanate adduct of trimethylolpropane, and xylylene diisocyanate adduct of trimethylolpropane; epoxy compounds such as bisphenol A, epichlarohydrin-type epoxy resins, ethylene glycol diglycidyl ether, and polyethylene glycol diglycidyl ether; aldehyde compounds such as glyoxal, malondialdehyde, succindialdehyde, maleindialdehyde, and formaldehyde; amine compounds such as hexamethylenediamine, triethylenediamine, polyethyleneimine, hexamethylenetetramine; chlorides of polyhydric metals such as aluminum, iron, copper, zinc, tin, titanium and nickel; other metal salts; and metal chelate compounds such as acetylacetone or acetoacetate ester coordination compounds of polyhydric metals such as aluminum, iron, copper, zinc, tin, titanium and nickel.

In the optical interconnection apparatus according to the third aspect, on the other than, the silicone-base pressure-sensitive adhesive (hereinafter called "the addition reaction-type silicone pressure-sensitive adhesive") which undergoes crosslinking through a hydrosilation reaction can be used as an adhesive for the formation of the adhesive layer. Any addition reaction-type silicone-base pressure-sensitive adhesive can be used insofar as it has adhesiveness sufficient to retain the pattern of the optical fibers against tensions which may be produced when the routed optical fibers are bent.

Silicone-base pressure-sensitive adhesives include addition reaction-type silicone-base pressure-sensitive adhesives, each of which cures by crosslinking through a hydrosilation reaction, and peroxide-curing silicone-base pressure-sensitive adhesive each of which cures by crosslinking through a radical reaction with a peroxide. These silicone-base pressure-sensitive adhesives are excellent in heat resistance and freeze resistance, and can be used at such high temperatures and low temperatures that non-silicone-base pressure-sensitive adhesives are not usable. Further, they are excellent in electrical insulating property, chemical resistance, weatherability and waterproofness, and exhibit superb tack to a wide variety of materials such as silicone rubber, silicone-impregnated glass cloths and fluorinated resins. The peroxide-curing type requires two-stage curing consisting of predrying at 100° C. and curing at 150° C. or higher. Moreover, the peroxide-curing type involves, as problems, formation of byproducts due to decomposition of a peroxide and corrosion of metals by the byproducts. An addition reaction-type silicone-base pressure-sensitive adhesive, on the other hand, has advantages such that its curing by crosslinking is completed at a temperature as low as 100° C. or so, no decomposition products are formed, and no problem arises as to odor or corrosion. This addition reaction-type silicone-base pressure-sensitive additive is therefore used in the optical interconnection apparatus according to the third aspect of the present invention.

Compared with the peroxide-curing type, the use of the addition reaction-type silicone pressure-sensitive adhesive can simplify the production steps of an adhesive sheet, can assure more firm adhesion with a protective resin layer formed of a silicone-base material, and can provide an optical interconnection apparatus excellent in reliability such as stress relaxation, heat resistance, freeze resistance, moisture resistance, chemical resistance, dust resistance and electrical insulating property. The optical interconnection apparatus so fabricated is, therefore, applicable to a broader range of use environments. Moreover, different form the peroxide-curing type, a transfer process in which a pressure-sensitive adhesive layer is arranged by transfer can be used, thereby facilitating fabrication of an optical interconnection apparatus including only a protective resin layer without a base. Accordingly, the fabrication process can be applied to a wider range of optical interconnection apparatuses.

In the optical interconnection apparatus according to the first aspect of the present invention, the flexible silicone-base material (hereinafter called "the condensation reaction-type silicone material") which is curable through the condensation reaction with liberation of the oxime or liberation of the alcohol is useful for the formation of the protective resin layer by which optical fibers are held in place. No particular limitation is imposed on the condensation reaction-type silicone material insofar as it cures through a condensation reaction with liberation of an oxime or liberation of an alcohol. From the standpoint of workability, however, one component type, liquid silicone rubbers having flowability are suited, with condensation reaction-type RTV silicone rubbers being particularly preferred from the standpoint of planarity such as curling. Incidentally, condensation reaction-type RTV silicone rubbers can be classified into the acetic acid type, the alcohol type, the oxime type, the acetone type, etc., depending on their curing mechanisms. In the present invention, however, the oxime type or alcohol type is used from the standpoint of adhesion with the acrylic pressure-sensitive adhesive, because upon curing, these condensation reaction-type silicone materials undergo a condensation reaction with liberation of an oxime or alcohol and achieve good adhesion with the acrylic pressure-sensitive adhesive.

Alcohol-liberating condensation reaction-type silicone materials are particularly preferred, as they do not damage plastics or metals, they do not give off much odor, and they have high safety.

In the optical interconnection apparatus according to the first aspect-of the present invention, it is preferred to have an adhesion promoter contained in the protective resin layer to obtain still better adhesion with the acrylic pressure-sensitive adhesive.

Examples of the adhesion promoter usable in the present invention can include compounds represented by the following formula (I):

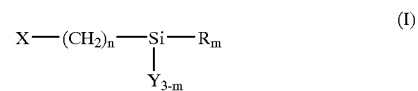

wherein X represents a chlorine atom, vinyl group, methacryl group, epoxy group, amino group or mercapto group, R represents a halogen atom or an alkoxy group having 1 to 4 carbon atoms, Y represents a hydrocarbon group having 1 to 4 carbon atoms, n stands for an integer of from 1 to 10, and m stands for an integer of from 1 to 3.

Specific examples can include vinyltrichlorosilane, vinyltrimethoxysilane, vinyltriethoxysilane, vinyltris-(β-methoxyethoxy)silane, vinyltris(t-butylperoxy)silane, γ-methacryloxypropyltrimethoxysilane, γ-aminopropyltriethoxysilane, γ-(β-aminoethyl)aminopropyltrimethoxysilane, γ-(β-aminoethyl)aminopropylmethyldimethoxysilane, γ-mercapto-propyltrimethoxysilane, and γ-chloropropyltrimethoxysilane. Among these, those containing a vinyl group, methacryl group, epoxy group or amino group are preferably used and especially, those containing an amino group are used more preferably.

In the present invention, the proportion of the adhesion promoter to be added may be chosen as needed depending on the purpose. In general, however, it may be added in a range of from 0.01 to 50 wt. %, preferably from 0.01 to 30 wt. %, more preferably from 0.1 to 10 wt. %, all based on the condensation reaction-type silicone material.

In the optical interconnection apparatus according to the second aspect of the present invention, a coating material obtained by adding the adhesion promoter to the silicone-base, material (hereinafter called "the addition reaction-type silicone-material") which is curable by crosslinking through a hydrosilation reaction is used for the formation of the protective resin layer by which the optical fibers are held in place. No particular limitation is imposed on the addition reaction-type silicone material insofar as it cures by crosslinking through a hydrosilation reaction. Specifically, a silicone material which contains a functional-group-containing silicone oil as a principal component and a hydrogenorganopolysiloxane as a crosslinker and is cured using a platinum catalyst can be mentioned. The functional groups can be any functional groups insofar as they contain an aliphatic unsaturated bond. From the standpoint of synthesis or economy, however, vinyl groups are most common. As substituents to Si groups other than vinyl groups, methyl groups are commonly used. To impart heat resistance or low-temperature resistance, however, phenyl groups are used. When importance is placed on solvent resistance, fluorine-substituted alkyl groups such as trifluoropropyl groups are used. A hydrogenorgano-polysiloxane is a polymer of relatively low molecular weight which contains SiH groups in its molecule. In general, one containing 3 or more SiH groups in a molecule is used.

Addition reaction-type silicone materials, compared with other silicone materials, have merits such that curing is even from a surface to an inside (possession of deep-curability) and desired working life and shelf-stable curing conditions can be set by choosing the kind and amount of a curing catalyst or using a retarding agent. Further, these addition reaction-type silicone materials are of the energy saving type, because the steps of measuring, mixing, charging of a coating material and coating can be automated and they can be cured in short time by heating. As the addition reaction-type silicone-materials do not form byproducts like the condensation reaction-type silicone materials, they require neither post curing nor drying for long time. In addition, they are also characterized in that they do not develop polysiloxane cleavage at elevated temperatures under hermetic conditions and are excellent in weatherability.

Although the addition reaction-type silicone materials have extremely good characteristics for application as optical interconnection apparatuses as described above, they inherently have excellent release properties and hence, are inferior in adhesion with other materials. To lessen this problem, the adhesion promoter is added to the addition reaction-type silicone material in the present invention so that the adhesion with the acrylic pressure-sensitive adhesive can be improved.

As the adhesion promoter for use in the present invention, a silane coupling agent represented by the following formula (II) is preferred:

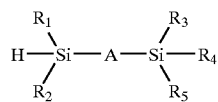

(II)

wherein A represents a substituted or unsubstituted hydrocarbon chain, $R_1$ and $R_2$ may be the same or different and represent a hydrogen atom or a substituted or unsubstituted alkyl group, and $R_3$, $R_4$ and $R_5$ may be the same or different and represent at least one substituent selected from the group consisting of alkyl groups, alkoxy groups, alkoxy groups of the alkyl ether structure and a chlorine atom with a proviso that one of $R_3$, $R_4$ and $R_5$ is an alkoxy group or an alkoxy group of the alkyl ether structure.

In the above formula (II), the hydrocarbon chain—which is the backbone A connecting both end groups together—is an 5 alkylene group having 1 to 18, more preferably 1 to 10, still more preferably 1–5 carbon atoms, and may be substituted by one or more alkyl groups such as methyl groups or ethyl groups. Particularly preferred alkylene group are an ethylene group and propylene group.

As the adhesion promoter in the present invention, it is preferred to add a hydrogenpolysiloxane to the above-described silane coupling agent to adjust the surface tension or solubility parameter. This makes it possible to further improve the miscibility with the addition reaction-type silicone material and also the adhesion with the acrylic pressure-sensitive adhesive. A desired hydrogenpolysiloxane can be chosen depending on its application purpose. Although not limited particularly, those represented by the following formula (III) can be mentioned by way of example:

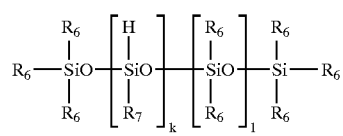

(III)

wherein plural $R_6S$ may be the same or different and each independently represent a hydrogen atom, phenyl group, alkyl-substituted phenyl group, alkoxyl group, carboxyl group, epoxy group, hydroxyl group, vinyl group or acryl group, $R_7$ represents an alkyl group, phenyl group, alkyl-substituted phenyl group, alkoxyl group, carboxyl group, epoxy group, hydroxy group, vinyl group or acryl group, k stands for an integer of from 3 to 80, l stands for an integer of from 1 to 60, and k+l=8 to 98.

Among the hydrogenpolysiloxanes represented by the above-described formula (III), more preferred are represented by the following formula (III-1):

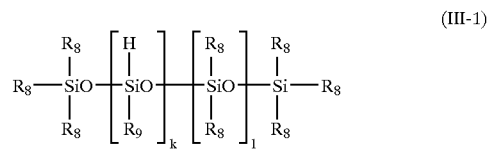

(III-1)

wherein plural $R_8S$ may be the same or different and each independently represent a hydrogen atom, methyl group or carboxyl group, $R_9$ represents an alkyl group having not more than 4 carbon atoms, k stands for an integer of from 3 to 80, l stands for an integer of from 1 to 60, and k+l=8 to 98.

The proportion of the adhesion promoter to be added may be chosen as needed depending on the purpose. In general, however, it may be added in a range of from 0.01 to 50 wt. %, preferably from 0.01 to 30 wt. %, more preferably from 0.1 to 10 wt. %, all based on the addition reaction-type silicone material.

When the hydrogenpolysiloxane is added to the silane coupling agent in the adhesion promoter, the proportion of the hydrogenpolysiloxane to be added may be chosen as needed depending on the purpose. In general, however, it may be added in a range of from 0.05 to 1000 wt. %, preferably from 0.1 to 500 wt. %, more preferably from 0.1 to 200 wt. %, all based on the silane coupling agent.

In the optical interconnection apparatus according to the third aspect of the present invention, a silicone-base material may be used for the formation of the protective resin layer by which the optical fibers are held in place. Although no particular limitation is imposed on its kind, one having flexibility is suitable to reduce stresses applied to the optical fibers. In particular, gel-form or rubbery silicone-base materials are preferred. More specifically, silicone gels, addition reaction-type silicone rubbers and condensation reaction-type silicone rubber, which are used for potting or sealing, can be used preferably.

In each of the optical interconnection apparatuses according to the first to third aspects of the present invention, a protective resin layer may be arranged directly on the back side of the base film without routing optical fibers there. In this modification, no particular limitation is imposed on the resin which makes up the protective resin layer insofar as it has flexibility. For example, gel-form or rubbery organic materials, curable resins having flexibility, such as ultraviolet-curing resins, electron beam curing resins and thermosetting resins, thermoplastic resin having flexibility and the like can be used. More specifically, silicone gels, acrylic resin gels, fluorinated resin gels and the like can be mentioned as gel-form organic materials, and as rubbery organic materials, silicone rubbers, urethane rubbers, fluorinated rubbers, acrylic rubbers, ethylene-acrylic rubbers, SBR, BR, NBR, chloroprene rubbers and the like can be mentioned. As curable resins having flexibility, epoxy resins, ultraviolet-curing resins, silicone resins and the like can be mentioned. As thermoplastic resins having flexibility, resins making up hot-melt adhesives, such as polyvinyl acetate, acrylic resins such as polyethyl methacrylate, polyvinylidene chloride resin, polyvinyl butyral resins and polyamide resins can be mentioned.

Over the protective resin layer as a surface of the optical interconnection apparatus, a further protective layer, may be arranged as needed. Where flexibility is not required so much, the further protective layer can be the same one as the above-described base film on which optical fibers are routed, and a sheet or plate made of an organic high molecular material, ceramic or the like can be used. Where an optical interconnection apparatus is required to be flexible, on the other hand, a hard-coated silicone-base material or the like can be used as an illustrative protective layer not impairing the flexibility of the optical interconnection apparatus.

In each optical interconnection apparatus according to the present invention, the optical fibers extend out from desired positions (ports) on opposite end faces of the optical interconnection apparatus so that end portions are formed. Optical connectors may be attached on the end portions, or the end portions may be arc-fusion-spliced with optical fibers interconnected to optical connectors. No particular limitation is imposed on the optical connectors which may be interconnected to the optical interconnection apparatus according to the present invention, but single-fiber or multiple-fiber small optical connectors can be chosen suitably. Examples can include MOP optical connectors, MT optical connectors, MU optical connectors, FPC optical connectors [NTT R&D, 45, 6, 589], and V-grooved parts useful for optical interconnections. No particular limitation is imposed on the interconnection method of optical connectors, and the end portions and their corresponding optical connectors may be integrated together.

In the present invention, the optical interconnection apparatus equipped, with the single base may be fabricated as will be described next.

For example, the above-described adhesive layer is firstly arranged on one side of a base having a two-dimensional plane, and on the adhesive layer, optical fibers are routed in a desired pattern. At this time, the opposite ends of the optical fibers are located extending out from the base such that they can be adapted as end portions for permitting optical interconnections with optical connectors or the like. As a process for arranging the adhesive layer, it is possible to adopt a process, in which the adhesive layer is arranged by coating the adhesive, either as is or in the form of a coating material dissolved in a solvent, on the base by a method such as roll coating, bar coating, blade coating, casting, dispenser coating, spray coating or screen printing, or another process in which an adhesive sheet with the adhesive layer formed in advance on a release film is laminated on the base film and the release film is then removed to transfer the adhesive layer. It is also possible to use an adhesive sheet with an adhesive layer formed on a release film, as is, as a base. For the adhesive layer, a suitable thickness can be chosen and used depending on the diameter of optical fibers to be routed. Its thickness is set generally in a range of from 1 $\mu$m to 1 mm, preferably from 5 to 500 $\mu$m, more preferably from 10 to 300 $\mu$m.

An optical interconnection apparatus according to the present invention can be fabricated by forming a protective resin layer on the optical fibers, which have been routed as described above, with the above-described silicone-base material as a material for the formation of the protective resin layer such that the routed optical fibers are held in place in an embedded form.

Depending on the diameter of the routed optical fibers and the overlapped number of the routed optical fibers, a suitable thickness may be chosen for the protective resin layer with the optical fibers routed therein such that the optical fibers can be protected and held in place. In general, a thickness of (the diameter of optical fibers)×(the number of overlapping fibers) or greater is needed. For the protective resin layer without any optical fibers routed therein, on the other hand, a thickness of such an extent as reducing the stiffness of the base film may be chosen suitably depending on the application purpose of the optical interconnection apparatus. In general, the thickness is set within a range of from about 1 $\mu$m to several centimeters, preferably of 10 $\mu$m to 10 mm, more preferably of 30 $\mu$m to 1 mm.

As a simplest process for the arrangement of the protective resin layer on the base with the optical fibers routed thereon or on the back side of the base, it can be formed by arranging an edge-dam along or in the vicinity of the peripheral edges of the base, filling a resin material inside the thus-formed edge-dam and then solidifying it there. The protective resin layer can be formed, for example, by a process in which the resin material for the formation of the protective resin layer is formed into a coating material by dissolving it in a suitable solvent and the coating material is then added dropwise and dried, a process in which a material for the formation of the protective resin layer, said material being in a liquid form, is added dropwise and is hardened under heat or is hardened by applying moisture at room temperature, a process in which a material for the formation of the protective resin layer is added dropwise in a heated and melted form and is then allowed to become a solid, or a process in which a resin material is filled in the form of a solid, is melted by heating the resin material or the whole optical interconnection apparatus and is then allowed to become a solid.

It is generally sufficient if the edge-dam is arranged along or in the vicinity of the entire peripheral edges of a base. However, these optical components may be able to play the role of an edge-dam where optical components such as optical connectors, optical modulators, optical devices or the like are mounted in the vicinity of the peripheral edge of the base. In such a case, it is no longer necessary to arrange an edge-dam at the areas where the optical components are mounted.

The material for forming the edge-dam is not limited to any specific one, and preferably, can be selected suitably depending on the application purpose of the optical interconnection apparatus. In particular, a nonwoven fabric made of organic fibers such as polyethylene, polypropylene or nylon fibers, a nonwoven fabric of glass fibers, or a sealing compound (filler) of a silicone-base, epoxy-base, urethane-base or acrylic resin can be used suitably. No limitation is imposed on the size and shape of the edge-dam insofar as it can prevent the resin material, which is to be filled inside the edge-dam, from flowing out.

Where the adhesive layer formed of the acrylic pressure-sensitive adhesive is not arranged on the back side of the base film in the above-described optical interconnection apparatus and the protective resin layer arranged on the back side of the base film, the above-described materials for the formation of protective resin layers can each be used as a material for the formation of the protective resin layer, and for example, gel-form or rubbery organic materials, curable resins having flexibility, such as ultraviolet-curing resins, electron beam curing resins and thermosetting resins, thermoplastic resin having flexibility and the like can be used. The protective resin layer can be formed by arranging the above-described edge-dam and filling the above-described material inside the edge-dam.

Where an adhesive layer formed of an acrylic pressure-sensitive adhesive is arranged on the back side of a base and optical fibers are routed in a desired pattern, a protective resin layer can be formed as described above by using a condensation reaction-type silicone material or an addition reaction-type silicone material with an adhesion promoter added thereto. Where an adhesive layer formed of an addition reaction-type silicone-base pressure-sensitive adhesive is arranged on the back side of a base and optical fibers are routed in a desired pattern, a protective resin layer can be formed with a silicone-base material as described above.

In the case of an optical interconnection apparatus in which optical fibers are held in place in a form embedded in a protective resin layer without a base, the optical interconnection apparatus may be fabricated, for example, as will be described next. Namely, an adhesive layer formed of the above-described pressure-sensitive adhesive is arranged on a release film and plural optical fibers are then routed on the adhesive layer. After that, the protective resin layer is formed as described above. The release film is then removed, and on the exposed adhesive layer, a protective resin layer is formed by using the above-described silicone-base material. In this case, plural optical fibers may be routed on the exposed adhesive layer, followed by the formation of a protective resin layer on the routed optical fibers with the above-described silicone-base material.

Further, an optical interconnection apparatus formed of a stacked structure of multi-layered construction can also be obtained by fabricating plural optical interconnection apparatuses in advance by the above-described process, arranging adhesive layers on surfaces of the protective resin layers either directly or by transferring the adhesive layers from adhesive sheets with the adhesive layers arranged thereon in advance, and then adhering the plural optical connection apparatuses together.

In each of the optical interconnection apparatuses according to the present invention fabricated as described above, optical components such as optical connectors or optical modules are interconnected to the outwardly-extended end portions of the optical fibers. For example, the end portions of the optical fibers, said end portions having been subjected to endface treatment to attach optical connectors, are interconnected to the optical connectors, or endfaces of optical fibers secured to optical connectors and endfaces of respective optical fibers located extending out from the optical interconnection apparatus are arc-fusion-splice to each other.

EXAMPLES

The present invention will hereinafter be described by examples, but the present invention shall not be limited to them.

Test 1

To 100 parts of a 30% ethyl acetate solution of an acrylic resin consisting of an n-butylacrylate/methyl acrylate/acrylic acid/2-hydroxyethyl methacrylate copolymer (=82/15/2.7/0.3), 1.0 part of "Colonate L" (product of Nippon Polyurethane Industry Co., Ltd., tolylene diisocyanate adduct of trimethylolpropane) was added, followed by mixing. The thus-obtained coating material of the acrylic pressure-sensitive adhesive was coated on one side of a 25-$\mu$m thick polyimide film to give a dry coat thickness of 50 $\mu$m. The resulting acrylic pressure-sensitive adhesive layer was then formed into a coating, whereby sheets were prepared.

On those sheets, oxime-liberating condensation reaction-type silicone materials, which were composed of the materials shown below in Table 1, were separately coated to a thickness of 500 $\mu$m by roll coating, followed by solidification under the conditions shown in Table 1. Scores were then formed in a crossed pattern by a sharp utility knife. At the scored area, the coated sheets were folded four, and the extents of separation of the coatings from the polyimide films were determined. As a result, it was confirmed that no separation of the acrylic pressure-sensitive adhesive took place and good adhesion was exhibited.

Further, samples similar to those prepared above were also prepared. After they were subjected to a damp heat test (they were left over for 5,000 hours at 75° C. and 90%RH) and also to a heat cyclic test (−40° C. to 75° C., 500 cycles) scores were formed in a crossed pattern by a sharp utility knife in a similar manner as described above. The samples were folded four at the scored areas, and the extents of separation of the coatings from the polyimide films were determined. As a result, it was confirmed that no separation of the acrylic pressure-sensitive adhesive took place and good adhesion was exhibited.

TABLE 1

| Product name | Maker | Curing conditions |
| --- | --- | --- |
| KE45-T | Shin-Etsu Chemical Co., Ltd. | 25° C., 24 hours |
| KE445 | Shin-Etsu Chemical Co., Ltd. | 25° C., 24 hours |
| SE5004 | DOW Corning Toray Silicone Co., Ltd. | 25° C., 72 hours |
| TSE387 | Toshiba Silicone Co., Ltd. | 25° C., 24 hours |
| TSE389 | Toshiba Silicone Co., Ltd. | 25° C., 24 hours |
| XE11-A0286 | Toshiba Silicone Co., Ltd. | 25° C., 24 hours |
| BATH BOND | KONISHI CO., LTD. | 25° C., 24 hours |

Example 1

To 100 parts of a 30% ethyl acetate solution of an acrylic resin consisting of an n-butyl acrylate/methyl acrylate/acrylic acid/2-hydroxyethyl methacrylate copolymer (=82/15/2.7/0.3), 1.0 part of "Colonate L" (product of Nippon Polyurethane Industry Co., Ltd., tolylene diisocyanate adduct of trimethylolpropane) was added, followed by mixing. The thus-obtained coating material of the acrylic pressure-sensitive adhesive was coated on one side of a 125-$\mu$m thick polyimide film to give a dry coat thickness of 100 $\mu$m. The resulting acrylic pressure-sensitive adhesive layer was then formed into a coating, whereby a sheet (size: 210 mm×297 mm) was prepared. Optical fibers (product of The Furukawa Electric Co., Ltd., carbon-coated optical fibers, 250 $\mu$m in diameter) were routed on the sheet as will be described next. Namely, 16 optical fibers were arranged in parallel with each other at pitches of 300 $\mu$m, and 8 ports (each port was formed of 16 optical fibers) were formed at pitches of 25 mm on each of opposite sides, i.e., shorter sides of the polyimide film. Each optical fiber was routed extending from one of the shorter sides of the polyimide film to the other shorter side. The routing to the individual ports on the opposite sides was designed to provide each of the optical fibers with desired free-access routing (128 fibers), and the routing of the optical fibers was adjusted to limit the maximum number of overlapping optical fibers at 3 fibers.

On and along peripheral edge portions of the polyimide film with the optical fibers routed thereon, a silicone-base filling compound (product of KONISHI CO., LTD., "BATH BOND") was then coated to form an edge-dam of 1.5 mm in width and 1 mm in thickness. A silicone rubber coating material (product of Dow Corning Toray Silicone Co., Ltd., "SE-5004") was thereafter added dropwise to the inside of the edge-dam, and the silicone rubber was cured under conditions of 25° C. and 72 hours to form a protective resin layer such that the optical fibers were held by the protective resin layer. An optical circuit board of 1.2 mm in thickness was thus fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.7 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.2 dB or less. The optical circuit board was therefore found to be satisfactorily usable as an optical interconnection apparatus.

Example 2

In Example 1, each port was formed of 8 optical fibers, MT connectors (8-fiber optical connectors) were used instead of the MU connectors, the optical fibers with only one ends thereof attached on the MT connectors before the optical fibers were routed, and the routing conditions for the optical fibers were changed such that the total number of all the optical fibers and the maximum number of overlapping optical fibers were set at 64 fibers and 2 fibers, respectively. Further, an edge-dam was formed in a similar manner as in Example 1 except that its width and thickness were changed to 1.5 mm and 500 $\mu$m, and a silicone rubber coating material (product of Toshiba Silicone Co., Ltd. "TSE389") was used as a protective resin layer and was cured at 25° C. for 24 hours. On and along peripheral edge portions of the back side of the polyimide film, a silicone-base filling compound (product of KONISHI CO., LTD., "BATH BOND") was then coated to form an edge-dam of 1.5 mm in width and 500 $\mu$m in thickness. A silicone rubber coating material (product of Toshiba Silicone Co., Ltd., "TSE389") was thereafter coated to the inside of the edge-dam, and the silicone rubber was cured at 25° C. and 24 hours, whereby an optical circuit board of 1.2 mm in thickness was fabricated. MT connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was-found to be 0.6 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.3 dB or less. The optical circuit board was therefore found to be satisfactorily usable as an optical interconnection-apparatus.

Example 3

In Example 1, a base film (size: 210 mm×297 mm) was provided by coating a 125-$\mu$m thick polyimide film on both sides thereof with an acrylic pressure-sensitive adhesive, which was the same as that employed in Example 1, to a thickness of 100 $\mu$m and adhering a release film onto one side of the polyimide film. In a similar manner as in Example 1, optical fibers were routed on the other side of the polyimide film. Using a silicone rubber coating material (product of Shin-Etsu Chemical Co., Ltd. "KE45-T") instead of the silicone-base filling compound, an edge-dam of 1.5 mm in width and 1 mm in height was then formed along the peripheral edges of the polyimide film. A silicone rubber coating material (product of Shin-Etsu Chemical Co., Ltd., "KE445") was added dropwise to the inside of the edge-dam and then, the silicone rubber was cured under conditions of 25° C. and 24 hours to form a first protective resin layer, whereby the optical fibers were held in place in an embedded form.

Thereafter, the release film which was located on the back side of the polyimide film was peeled off, and on the adhesive layer, routing of 64 free-access optical fibers was conducted such that the total number of the optical fibers was 64 and the maximum number of overlapping optical fibers was limited to 2. Using a silicone rubber coating material (product of Shin-Etsu Chemical Co., Ltd., "KE45-T"), another edge-dam of 1.5 mm in width and 500 $\mu$m in height was then formed along peripheral edge portions of the polyimide film on which the optical fibers had been routed. A silicone rubber coating material (product of Shin-Etsu Chemical Co., Ltd., "KE445") was next added dropwise to the inside of the edge-dam and then, the silicone rubber was cured under conditions of 25° C. and 24 hours to form a second protective resin layer, whereby the optical fibers were held in place in an embedded form. Accordingly, an optical circuit board of 1.8 mm in thickness was fabricated. MU connectors were then attached on the outwardly-extended ends of the optical fibers to obtain an optical circuit board.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.8 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.4 dB or less. The optical circuit board was therefore found to be satisfactorily usable as an optical interconnection apparatus.

Example 4

An optical interconnection apparatus was fabricated in a similar manner as in Example 1 except that a silicone rubber coating material (product of Toshiba Silicone Co., Ltd., "TSE389") was used instead of the silicone rubber coating material and was cured under conditions of 25° C. and 24 hours.

On the back side of the polyimide film, an acrylic pressure-sensitive adhesive which was the same as that used in Example 1 was coated such that an adhesive layer of 100 μm in thickness was formed. On the adhesive layer, optical fibers were routed in a similar manner as in Example 1.

On and along peripheral edge portions of the polyimide film with the optical fibers routed thereon, a silicone-base filling compound (product of KONISHI CO., LTD., "BATH BOND") was then coated to form an edge-dam of 1.5 mm in width and 1 mm in thickness. A silicone rubber coating material (product of Toshiba Silicone Co., Ltd., "TSE389") was then coated to the inside of the edge-dam and was cured at 25° C. and 24 hours to form a second protective resin layer, whereby an optical interconnection apparatus of 2.3 mm in thickness was fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.5 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.2 dB or less. The optical circuit board was therefore found to be satisfactorily usable as an optical interconnection apparatus.

Example 5

Two optical interconnection apparatuses were fabricated in a similar manner as in Example 4.

On the second protective resin layer of one of the optical interconnection apparatuses, a silicone-base pressure-sensitive adhesive coating material [product of Dow Corning Toray Silicone Co., Ltd., SD4590/BY24-741/SRX212/toluene=100/1.0/0.9/50 (parts by weight)] was next coated by dispenser coating. After it was dried at 100° C. for 3 minutes, an adhesive layer of 100 μm in thickness was formed. The other optical interconnection apparatus was stacked on and adhered to the adhesive layer, whereby an optical circuit board of a stacked structure of 4.7 mm in thickness was fabricated.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.8 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.5 dB or less. The optical circuit board was therefore found to be satisfactorily usable as an optical interconnection apparatus.

Example 6

Two optical interconnection apparatuses were fabricated in a similar manner as in Example 3.

On the second protective resin layer of one of the optical interconnection apparatuses, a silicone-base pressure-sensitive adhesive coating material [product of Dow Corning Toray Silicone Co., Ltd., SD4590/BY24-741/SRX212/toluene=100/1.0/0.9/50 (parts by weight)] was next coated by dispenser coating and then dried at 100° C. for 3 minutes, whereby an adhesive layer of 100 μm in thickness was formed. The other optical interconnection apparatus was stacked on and adhered to the adhesive layer, whereby an optical circuit board composed of a stacked structure of 3.7 mm in thickness was fabricated.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.6 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.4 dB or less. The optical circuit board was therefore found to be satisfactorily usable as an optical interconnection apparatus.

Example 7

The same acrylic pressure-sensitive adhesive coating material as that employed in Example 1 was coated on one side of a 75-μm thick silicone-base release film to give a dry coat thickness of 100 μm, whereby an acrylic pressure-sensitive adhesive layer was formed and a sheet (size: 210 mm×297 mm) was prepared. Optical fibers were routed on the sheet in a similar manner as in Example 1.

On and along peripheral edge portions of the release film with the optical fibers routed thereon, an edge-dam of a silicone-base filling compound (product of KONISHI CO., LTD., "BATH BOND") was formed in a similar manner as in Example 1. A silicone rubber coating material (product of Toshiba Silicone Co., Ltd., "TSE389") was thereafter added dropwise to the inside of the edge-dam, and the silicone rubber was cured under conditions of 25° C. and 24 hours to form a first protective resin layer.

Next, the silicone-base release film was peeled off, and on the exposed pressure-sensitive adhesive layer on its back side, a second protective resin layer was formed. Described specifically, on and along peripheral edge portions of the pressure-sensitive adhesive layer on the back side, a silicone-base filling compound (product of KONISHI CO., LTD., "BATH BOND") was coated to form an edge-dam of 1.5 mm in width and 500 μm in height. A silicone rubber coating material (product of Toshiba Silicone Co., Ltd., "TSE389") was added dropwise to the inside of the edge-dam, and the silicone rubber was cured under conditions of 25° C. and 24 hours to form a second protective resin layer. An optical circuit board of 1.6 mm in thickness was thus fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.5 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.3 dB or less. The optical circuit board was therefore found to be satisfactorily usable as an optical interconnection apparatus.

Example 8

In a similar manner as in Example 7, a pressure-sensitive adhesive layer was formed on a release film, and optical fibers were routed on the pressure-sensitive adhesive layer. On and along peripheral edge portions of the release film after the routing of the optical fibers, an edge-dam of a silicone-base filling compound (product of KONISHI Co., LTD., "BATH BOND") was formed. A silicone rubber coating material (product of Shin-Etsu Chemical Co., Ltd., "KE445") was added dropwise to the inside of the edge-dam, and the silicone rubber was cured under conditions of 25° C. and 24 hours to form a first protective resin layer.

Next, the silicone-base release film was peeled off, and on the exposed pressure-sensitive adhesive layer on its back side, optical fibers were routed such that each port was composed of 8 optical fibers, the total number of the optical fibers was 64 and the maximum number of overlapping optical fibers was limited to 2. On the pressure-sensitive adhesive layer with the optical fibers routed thereon, a second protective resin layer was then formed. Described specifically, on and along peripheral edge portions of the pressure-sensitive adhesive layer on the back side, a silicone-base filling compound (product of KONISHI CO., LTD., "BATH BOND") was coated to form an edge-dam of 1.5 mm in width and 500 us in height. A silicone rubber coating material (product of Shin-Etsu Chemical Co., Ltd., "KE445N) was added dropwise to the inside of the edge-dam, and the silicone rubber was cured under conditions of 25° C. and 24 hours to form a second protective resin layer. An optical circuit board of 1.6 mm in thickness was thus fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.7 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.4 dB or less. The optical circuit board was therefore found to be satisfactorily usable as an optical interconnection apparatus.

Example 9

In a similar manner as in Example 1, two 125-μm thick polyimide films with optical fibers routed on pressure-sensitive adhesive layers thereof were prepared. On and along peripheral edge portions of one of the polyimide films, a silicone-base filling compound (product of KONISHI CO., LTD., "BATH BOND") was coated to form an edge-dam of 2.5 mm in width and 2 m in width. A silicone rubber coating material (product of Dow Corning Toray Silicone Co., Ltd., "SE-5004") was added dropwise to the inside of the edge-dam, and then, the other polyimide film with the optical fibers routed thereon was downwardly covered. The silicone rubber was cured under conditions of 25° C. and 72 hours to form a protective resin layer such that the optical fibers were held in place by the protective resin layer. An optical circuit board of 2.45 mm in thickness was thus fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was tree of displacements (a loss in the intactness of the routing pattern). The optical circuit board was free of the potential breakage problem by deformations such as bending.

An optical loss of all the interconnected optical fibers was measured. It was found to be 0.8 dB or less including losses due to the interconnections with the optical connectors. With respect to optical circuit board so fabricated, a damp heat test (it was left over for 5,000 hours at 75° C. and 90%RH) and a heat cyclic test (−40° C. to 750° C., 500 cycles) were conducted. Variations and fluctuations in optical loss were both 0.6 dB or less. The optical circuit board was therefore found to be satisfactorily usable as an optical interconnection apparatus.

Example 10

In a similar manner as in Example 9, an optical interconnection apparatus was fabricated. On and along peripheral edge portions on the back sides of the respective polyimide films, a silicone-base filling compound (product of KONISHI CO., LTD., "BATH BOND") was coated to form edge-dams of 1.5 mm in width and 500 μm in height. A silicone rubber coating material (product of Toshiba Silicone Co., Ltd., "TSE389") was added dropwise to the insides of the edge-dams, and the silicone rubber was then cured under conditions of 25° C. and 24 hours to form second and third protective resin layers, whereby an optical circuit board of 3.45 mm in thickness was fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and, the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.6 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.4 dB or less. The optical circuit board was therefore found to be satisfactorily usable as an optical interconnection apparatus.

Test 2

In a similar manner as in Test 1, sheets each of which was provided with a acrylic pressure-sensitive adhesive layer formed on one side of a polyimide film were prepared. On those sheets, alcohol-liberating condensation reaction-type silicone materials, which were composed of the materials shown below in Table 2, were separately coated to a thickness of 500 μm by roll coating, followed by solidification under conditions of 25° C. and 72 hours. They were evaluated in a similar manner as in Test 1. As a result, it was confirmed that no separation of the acrylic pressure-sensitive adhesive took place and good adhesion was exhibited.

Further, samples similar to those prepared above were also prepared. After they were subjected to a damp heat test (they were left over for 5,000 hours at 75° C. and 90%RH) and also to a heat cyclic test (−40° C. to 75° C., 500 cycles), they were evaluated in a similar manner as in Test 1. As a result, it was confirmed that no separation of the acrylic pressure-sensitive adhesive took place and good adhesion was exhibited.

TABLE 2

| Coating material No. | Alcohol-liberating condensation reaction-type silicone material | | Adhesion promoter | |
|---|---|---|---|---|
| | Product name | Maker | Compound name | Added amount, wt. % |
| 1 | SE9187L | Dow Corning Toray Silicone Co., Ltd. | — | 0 |
| 2 | SE9140 | Dow Corning Toray Silicone Co., Ltd. | — | 0 |
| 3 | TSE3925 | Toshiba Silicone Co., Ltd. | — | 0 |
| 4 | SE9185 | Dow Corning Toray Silicone Co., Ltd. | — | 0 |
| 5 | SE9140 | Dow Corning Toray Silicone Co., Ltd. | γ-Methacryloxypropyl-trimethoxysilane | 5 |
| 6 | SE9140 | Dow Corning Toray Silicone Co., Ltd. | Vinyltrimethoxysilane | 20 |
| 7 | SE9140 | Dow Corning Toray Silicone Co., Ltd. | γ-Aminopropyltriethoxysilane | 3 |
| 8 | SE9140 | Dow Corning Toray Silicone Co., Ltd. | γ-(β-Aminoethyl)aminopropyl-trimethoxysilane | 0.1 |
| 9 | TSE399 | Toshiba Silicone Co., Ltd. | γ-(β-Aminoethyl)aminopropyl-methyldimethoxysilane | 0.5 |
| 10 | TSE399 | Toshiba Silicone Co., Ltd. | γ-Glycidoxypropyltrimethoxysilane | 8 |
| 11 | TSE399 | Toshiba Silicone Co., Ltd. | γ-Mercaptopropyltrimethoxysilane | 15 |
| 12 | TSE399 | Toshiba Silicone Co., Ltd. | γ-Chloropropyltrimethoxysilane | 25 |

The added amounts of the adhesion promoters are indicated in term of percentage based on the corresponding alcohol-liberating condensation reaction-type silicone-base materials.

Example 11

To 100 parts of a 30% ethyl acetate solution of an acrylic resin consisting of an n-butyl acrylate/methyl acrylate/acrylic acid/2-hydroxyethyl methacrylate copolymer (−82/15/2.7/0.3), 1.0 part of "Colonate L" (product of Nippon Polyurethane Industry Co., Ltd., tolylene diisocyanate adduct of trimethylolpropane) was added, followed by mixing. The thus-obtained coating material of the acrylic pressure-sensitive adhesive was coated on one side of a 125-μm thick polyimide film to give a dry coat thickness of 100 μm. The resulting acrylic pressure-sensitive adhesive layer was then formed into a coating, whereby a sheet (sizes 210 mm×297 mm) was prepared. Optical fibers (product of The Furukawa Electric Co., Ltd., carbon-coated optical fibers, 250 μm in diameter),were routed on the sheet as will be described next. Namely, 16 optical fibers were arranged in parallel with each other at pitches of 300 μm, and 8 ports (each port was formed of 16 optical fibers) were formed at pitches of 25 mm on each of opposite sides, i.e., shorter sides of the polyimide film. Each optical fiber was routed extending from one of the shorter sides of the polyimide film to the other shorter side. The routing to the individual ports on the opposite sides was designed to provide each of the optical fibers with desired free-access routing (128 fibers), and the routing of the optical fibers was adjusted to limit the maximum number of overlapping optical fibers at 3 fibers.

On and along peripheral edge portions of the polyimide film with the optical fibers routed thereon, a silicone-base filling compound (product of KONISHI CO., LTD., "BATH BOND") was then coated to form an edge-dam of 1.5 mm in width and 1 mm in thickness. A silicone rubber coating material (product of Dow Corning Toray Silicone Co., Ltd., "SE9187L") was thereafter added dropwise to the inside of the edge-dam, and the silicone rubber was cured under conditions of 25° C. and 72 hours to form a protective resin layer such that the optical fibers were held by the protective resin layer. An optical circuit board of 1.2 mm in thickness was thus fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.5 dB or less including losses due to the interconnections with the optical connectors. With respect to optical circuit board so fabricated, a damp heat test (it was left over for 5,000 hours at 75° C. and 90%RH) and a heat cyclic test (–40° C. to 75° C., 500 cycles) were conducted. Variations and fluctuations in optical lose were both 0.4 dB or less. The optical circuit board was therefore found to be satisfactorily usable as an optical interconnection apparatus.

Example 12

In Example 11, each port was formed of 8 optical fibers, MT connectors (8-fiber optical connectors) were used instead of the MU connectors, the optical fibers with only one ends thereof attached on the MT connectors before the optical fibers were routed, and the routing conditions for the optical fibers were changed such that the total number of all the optical fibers and the maximum number of overlapping optical fibers were set at 64 fibers and 2 fibers, respectively. Further, an edge-dam was formed in a similar manner as in Example 11 except that its width and thickness were changed to 1.5 mm and 500 µm, and an alcohol-liberating condensation reaction-type silicone rubber coating material (product of Dow Corning Toray Silicone Co., Ltd. "SE9140") was used as a protective resin layer and was cured under conditions of 25° C. and 72 hours. On and along peripheral edge portions of the back side of the polyimide film, a silicone-base filling compound (product of KONISHI CO., LTD., "BATH BOND") was then coated to form an edge-dam of 1.5 mm in width and 500 µm in thickness. An alcohol-liberating condensation reaction-type silicone rubber coating material (product of Dow Corning Toray Silicone Co., Ltd., "SE9140") was thereafter added dropwise to the inside of the edge-dam, and the silicone rubber was cured under conditions of 25° C. and 72 hours, whereby an optical circuit board of 1.2 mm in thickness was fabricated. MT connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.6 dB or less including losses due to the interconnections with the optical connectors. With respect to optical circuit board so fabricated, a damp heat test (it was left over for 5,000 hours at 75° C. and 90%RH) and a heat cyclic test (–40° C. to 75° C., 500 cycles) were conducted. Variations and fluctuations in optical loss were both 0.5 dB or less. The optical circuit board was therefore found to be satisfactorily usable as an optical interconnection apparatus.

Example 13

In Example 11, a base film (size: 210 mm×297 mm) was provided by coating a 125-µm thick polyimide film on both sides thereof with an acrylic pressure-sensitive adhesive, which was the same as that employed in Example 11, to a thickness of 100 µm and adhering a release film onto one side of the polyimide film. In a similar manner as in Example 11, optical fibers were routed on the other side of the polyimide film. Using a silicone rubber coating material (product of Toshiba Silicone Co., Ltd. "TSE3925") instead of the silicone-base filling compound, an edge-dam of 1.5 mm in width and 1 mm in height was then formed along the peripheral edges of the polyimide film. An alcohol-liberating condensation reaction-type silicone rubber coating material added with the adhesion promoter—which was of the formula of No. 5 in Table 2—was added dropwise to the inside of the edge-dam and then, the silicone rubber was cured under conditions of 25° C. and 72 hours to form a first protective resin layer, whereby the optical fibers were held in place in an embedded form.

Thereafter, the release film which was located on the back side of the polyimide film was peeled off, and on the adhesive layer, routing of 64 free-access optical fibers was conducted such that the total number of the optical fibers was 64 and the maximum number of overlapping optical fibers was limited to 2. Using a silicone rubber coating material (product of Toshiba Silicone Co., Ltd., "TSE3925"), another edge-dam of 1.5 mm in width and 500 µm in thickness was then formed along peripheral edge portions of the polyimide film on which the optical fibers had been routed. An alcohol-liberating type silicone rubber coating material added with the adhesive promoter—which was of the formula of No. 7 in Table 2—was next added dropwise to the inside of the edge-dam and then, the silicone rubber was cured under conditions of 25° C. and 72 hours to form a second protective resin layer, whereby the optical fibers were held in place in an embedded form. Accordingly, an optical circuit board of 1.8 mm in thickness was fabricated. MU connectors were then attached on the outwardly-extended ends of the optical fibers to obtain an optical circuit board.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.7 dB or less including losses due to the interconnections with the optical connectors. With respect to optical circuit board so fabricated, a damp heat test (it was left over for 5,000 hours at 75° C. and 90%RH) and a heat cyclic test (–40° C. to 75° C., 500 cycles) were conducted. Variations and fluctuations in optical loss were both 0.5 dB or less. The optical circuit board was therefore found to be satisfactorily usable as an optical interconnection apparatus.

Example 14

The same acrylic pressure-sensitive adhesive coating material as that employed in Example 11 was coated on one side of a 75-$\mu$m thick silicone-base release film to give a dry coat thickness of 100 $\mu$m, whereby an acrylic pressure-sensitive adhesive layer was formed and a sheet (size: 210 mm×297 mm) was prepared. Optical fibers were routed on the sheet in a similar manner as in Example 11.

On and along peripheral edge portions of the release film with the optical fibers routed thereon, an edge-dam of a silicone-base filling compound (product of KONISHI CO., LTD., "BATH BOND") was formed in a similar manner as in Example 11. An alcohol-liberating condensation reaction-type silicone rubber coating material added with the adhesion promoter—which was of the formula of No. 9 in Table 2—was thereafter added dropwise to the inside of the edge-dam, and the silicone rubber was cured under conditions of 25° C. and 72 hours to form a first protective resin layer.

Next, the silicone-base release film was peeled off, and on the exposed pressure-sensitive adhesive layer on its back side, a second protective resin layer was formed. Described specifically, on and along peripheral edge portions of the pressure-sensitive adhesive layer on the back side, a silicone-base filling compound (product of KONISHI CO., LTD., "BATH BOND") was coated to form an edge-dam of 1.5 mm in width and 500 $\mu$m in height. An alcohol-liberating condensation reaction-type silicone rubber coating material added with the adhesion promoter—which was of the formula of No. 10 in Table 2—was added dropwise to the inside of the edge-dam, and the silicone rubber was cured under conditions of 25° C. and 72 hours to form a second protective resin layer. An optical circuit board of 1.6 mm in thickness was thus fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.4 dB or less including losses due to the interconnections with the optical connectors. With respect to optical circuit board so fabricated, a damp heat test (it was left over for 5,000 hours at 75° C. and 90%RH.) and a heat cyclic test (−40° C. to 75° C., 500 cycles) were conducted. Variations and fluctuations in optical loss were both 0.5 dB or less. The optical circuit board was therefore found to be satisfactorily usable as an optical interconnection apparatus.

Test 3

In a similar manner as in Test 1, sheets each of which was provided with a acrylic pressure-sensitive adhesive layer formed on one side of a polyimide film were prepared. On those sheets, coating materials shown below in Table 3 which are prepared by blending an addition reaction-type silicone-base material with the adhesion promoter, were separately coated to a thickness of 500 $\mu$m by roll coating, followed by solidification under the conditions shown in Table 3. They were evaluated in a similar manner as in Test 1. As a result, it was confirmed that no separation of the acrylic pressure-sensitive adhesive took place and good adhesion was exhibited.

Further, samples similar to those prepared above were also prepared. After they were subjected to a damp heat test (they were left over for 5,000 hours at 75° C. and 90%RH) and also to a heat cyclic test (−40° C. to 75° C., 500 cycles), they were evaluated in a similar manner as in Test 1. As a result, it was confirmed that no separation of the acrylic pressure-sensitive adhesive took place and good adhesion was exhibited.

TABLE 3

| Coating material No. | Addition reaction-type silicone-base material | | Adhesion promoter | | Curing conditions |
|---|---|---|---|---|---|
| | Product name | Maker | Compound No. | Added amount, wt. % | |
| 1 | TSE3032 | Toshiba Silicone Co., Ltd. | Compound 1 | 0.5 | 100° C., 1 hr |
| 2 | TSE3032 | Toshiba Silicone Co., Ltd. | Compound 1 | 1 | 100° C., 1 hr |
| 3 | TSE3032 | Toshiba Silicone Co., Ltd. | Compound 1 | 5 | 100° C., 1 hr |
| 4 | TSE3032 | Toshiba Silicone Co., Ltd. | Compound 1 | 8 | 100° C., 1 hr |
| 5 | SH1850 | Dow Corning Toray Silicone Co., Ltd. | Compound 1 | 3 | 100° C., 1 hr |
| 6 | SH1850 | Dow Corning Toray Silicone Co., Ltd. | Compound 2 | 10 | 100° C., 1 hr |
| 7 | KE1206 | Shin-Etsu Chemical Co., Ltd. | Compound 3 | 3 | 150° C., 30 min |
| 8 | KE1206 | Shin-Etsu Chemical Co., Ltd. | Compound 4 | 5 | 150° C., 30 min |
| 9 | YE5822 | Toshiba Silicone Co., Ltd. | Compound 3 | 1 | 100° C., 1 hr |
| 10 | YE5822 | Toshiba Silicone Co., Ltd. | Compound 5 | 2 | 100° C., 1 hr |
| 11 | TSE3431 | Toshiba Silicone Co., Ltd. | Compound 3 Compound 6 | 3 1.5 | 100° C., 1 hr |
| 12 | TSE3431 | Toshiba Silicone Co., Ltd. | Compound 3 Compound 6 | 3 3 | 100° C., 1 hr |
| 13 | TSE3032 | Toshiba Silicone Co., Ltd. | Compound 3 Compound 6 | 3 6 | 100° C., 1 hr |
| 14 | TSE3032 | Toshiba Silicone Co., Ltd. | Compound 4 Compound 6 | 3 9 | 100° C., 1 hr |
| 15 | YE5822 | Toshiba Silicone Co., Ltd. | Compound 1 Compound 7 | 5 10 | 100° C., 1 hr |
| 16 | YE5822 | Toshiba Silicone Co., Ltd. | Compound 3 Compound 7 | 2 2 | 100° C., 1 hr |

TABLE 3-continued

| Coating material Product No. | name | Maker | Adhesion promoter Compound No. | Added amount, wt. % | Curing conditions |
|---|---|---|---|---|---|

The added amounts of the adhesion promoters are indicated in term of percentage based on the corresponding addition reaction-type silicone-base materials.

Compound 1:

$$\text{HSi}(\text{CH}_3)_2-(\text{CH}_2)_3-\text{Si}(\text{OCH}_3)_3$$

Compound 2:

$$\text{H}_2\text{Si}(\text{CH}_3)-(\text{CH}_2)_3-\text{Si}(\text{OCH}_3)_2(\text{CH}_3)$$

Compound 3:

$$\text{H}_3\text{Si}-(\text{CH}_2)_3-\text{Si}(\text{OC}_2\text{H}_5)_3$$

Compound 4:

$$\text{H}_2\text{Si}(\text{CH}_3)-(\text{CH}_2)_3-\text{Si}(\text{OC}_2\text{H}_3)_2(\text{CH}_3)$$

Compound 5:

$$\text{HSi}(\text{CH}_3)_2-(\text{CH}_2)_3-\text{SiOC}_2\text{H}_4\text{OCH}_3(\text{H})(\text{CH}_3)$$

Compound 6:

$$\text{CH}_3-\text{SiO}(\text{CH}_3)_2-[\text{SiO}(\text{H})(\text{CH}_3)]_6-[\text{SiO}(\text{CH}_3)_2]_6-\text{Si}(\text{CH}_3)_3$$

Compound 7:

$$\text{CH}_3-\text{SiO}(\text{CH}_3)_2-[\text{SiO}(\text{H})(\text{CH}_3)]_{28}-[\text{SiO}(\text{CH}_3)_2]_{14}-\text{Si}(\text{CH}_3)_2\text{H}$$

Example 15

To 100 parts of a 30% ethyl acetate solution of an acrylic resin consisting of an n-butyl acrylate/methyl acrylate/acrylic acid/2-hydroxyethyl methacrylate copolymer (=82/15/2.7/0.3), 1.0 part of "Colonate L" (product of Nippon Polyurethane Industry Co., Ltd., tolylene diisocyanate adduct of trimethylolpropane) was added, followed by mixing. The thus-obtained coating material of the acrylic pressure-sensitive adhesive was coated on one side of a 125-μm thick polyimide film to give a dry coat thickness of 100 μm. The resulting acrylic pressure-sensitive adhesive layer was then formed into a coating, whereby a sheet (size: 210 mm×297 mm) was prepared. Optical fibers (product of The Furukawa Electric Co., Ltd., carbon-coated optical fibers, 250 μm in diameter) were routed on the sheet as will be described next. Namely, 16 optical fibers were arranged in parallel with each other at pitches of 300 μm, and 8 ports (each port was formed of 16 optical fibers) were formed at pitches of 25 mm on each of opposite sides, i.e., shorter sides of the polyimide film. Each optical fiber was routed extending from one of the shorter sides of the polyimide film to the other shorter side. The routing to the individual ports on the opposite sides was designed to provide each of the optical fibers with desired free-access routing (128 fibers), and the routing of the optical fibers was adjusted to limit the maximum number of overlapping optical fibers at 3 fibers.

On and along peripheral edge portions of the polyimide film with the optical fibers routed thereon, a silicone-base filling compound (product of KONISHI CO., LTD., "BATH BOND") was then coated to form an edge-dam of 1.5 mm in width and 1 mm in thickness. A coating material—which was of the formula of No. 2 in Table 3, was composed of the addition reaction-type silicone material added with the adhesion promoter—was thereafter added dropwise to the inside of the edge-dam, and the silicone material was cured under conditions of 100° C. and 1 hour to form a protective resin layer such that the optical fibers were held by the protective resin layer. An optical circuit board of 1.2 mm in thickness was thus fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.7 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.2 dB or less. The optical circuit board was therefore found to be satisfactorily usable as an optical interconnection apparatus.

Example 16

In Example 15, each port was formed of 8 optical fibers, MT connectors (8-fiber optical connectors) were used instead of the MU connectors, the optical fibers with only one ends thereof attached on the MT connectors before the optical fibers were routed, and the routing conditions for the optical fibers were changed such that the total number of all the optical fibers and the maximum number of overlapping optical fibers were set at 64 fibers and 2 fibers, respectively. Further, an edge-dam was formed in a similar manner as in Example 15 except that its width and thickness were changed to 1.5 mm and 500 μm and a coating material—which was of the formula of No. 5 in Table 3, was composed of the addition reaction-type silicone material added with the adhesion promoter—was used as a material for a protective resin layer. On and along peripheral edge portions of the back side of the polyimide film, a silicone-base filling compound (product of KONISHI CO., LTD., "BATH BOND") was then coated to form an edge-dam of 1.5 mm in width and 500 μm in thickness. An addition reaction-type silicone material added with the adhesion promoter—which was of the formula of No. 5 in Table 3—was thereafter added dropwise to the inside of the edge-dam and was cured under conditions of 100° C. and 1 hour, whereby an optical circuit board of 1.2 mm in thickness was fabricated. MT connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.6 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C. 500 cycles) were conducted. Variations and fluctuations in optical loss were both 0.3 dB or less. The optical circuit board was therefore found to be satisfactorily usable as an optical interconnection apparatus.

Example 17

In Example 15, a base film (size: 210 mm×297 mm) was provided by coating a 125-μm thick polyimide film on both sides thereof with an acrylic pressure-sensitive adhesive, which was the same as that employed in Example 15, to a thickness of 100 μm and adhering a release film onto one side of the polyimide film. In a similar manner as in Example 15, optical fibers were routed on the other side of the polyimide film. Using a silicone rubber coating material (product of shin-Etsu Chemical Co., Ltd. "KE45-T") instead of the silicone-base filling compound, an edge-dam of 1.5 mm in width and 1 mm in height was then formed along,the peripheral edges of the polyimide film. A coating material—which was of the formula of No. 7 in Table 3, was composed of the addition reaction-type silicone material added with the adhesion promoter—was added dropwise to the inside of the edge-dam and then, the silicone-base material was cured under conditions of 150° C. and 30 minutes to form a first protective resin layer, whereby the optical fibers were held in place in an embedded form.

Thereafter, the release film which was located on the back side of the polyimide film was peeled off, and, on the adhesive layer, routing of 64 free-access optical fibers was conducted such that the total number of the optical fibers was 64 and the maximum number of overlapping optical fibers was limited to 2. Using a silicone' rubber coating material (product of Shin-Etsu Chemical Co., Ltd., "KE45-T"), another edge-dam of 1.5 mm in width and 500 μm in height was then formed along peripheral edge portions of the polyimide film on which the optical fibers had been routed. A coating material—which was of the formula of No. 7 in Table 3, was composed of the addition reaction-type silicone material added with the adhesion promoter—was next added dropwise to the inside of the edge-dam and then, the silicone-base material was cured under conditions of 150° C. and 30 minutes to form a second protective resin layer, whereby the optical fibers were held in place in an embedded form. Accordingly, an optical circuit board of 1.8 mm in thickness was fabricated. MU connectors were then attached on the outwardly-extended ends of the optical fibers to obtain an optical circuit board.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.8 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.4 dB or less. The optical circuit board was therefore found to be satisfactorily usable as an optical interconnection apparatus.

Example 18

Two optical interconnection apparatuses were fabricated in a similar manner as in Example 17 except that a coating material—which was of the formula of No. 12 in Table 3, was composed of the addition reaction-type silicone material added with the adhesion promoter—was used instead of the silicone-base material in Example 17 and was cured at 100° C. for 1 hour.

On the second protective resin layer of one of the optical interconnection apparatuses, a silicone-base pressure-sensitive adhesive coating material [product of Dow Corning Toray Silicone Co., Ltd., SD4590/BY24-741/SRX212/toluene=100/1.0/0.9/50 (parts by weight)] was next coated by dispenser coating. After it was dried at 100° C. for 3 minutes, an adhesive layer of 100 μm in thickness was formed. The other optical interconnection apparatus was stacked on and adhered to the adhesive layer, whereby an optical circuit board of a stacked structure of 3.7 mm in thickness was fabricated.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.8 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.5 dB or less. The optical circuit board was therefore found to be satisfactorily usable as an optical interconnection apparatus.

Example 19

The same acrylic pressure-sensitive adhesive coating material as that employed in Example 15 was coated on one side of a 75-μm thick silicone-base release film to give a dry coat thickness of 100 μm, whereby an acrylic pressure-sensitive adhesive layer was formed and a sheet (size; 210 mm×297 mm) was prepared. Optical fibers were routed on the sheet in a similar manner as in Example 15.

On and along peripheral edge portions of the release film with the optical fibers routed thereon, an edge-dam of a silicone-base filling compound (product of KONISHI CO., LTD., "BATH BOND") was formed in a similar manner as in Example 15. A coating material—which was of the formula of No. 16 in Table 3, was composed of the addition reaction-type silicone material added with the adhesion promoter—was thereafter added dropwise to the inside of the edge-dam, and the silicone-base material was cured under conditions of 100° C. and 1 hour to form a first protective resin layer.

Next, the silicone-base release film was peeled off, and on the exposed pressure-sensitive adhesive layer on its back side, a second protective resin layer was formed. Described specifically, on and along peripheral edge portions of the pressure-sensitive adhesive layer on the back side, a silicone-base filling compound (product of KONISHI CO., LTD., "BATH BOND") was coated to form an edge-dam of 1.5 mm in width and 500 µm in height. An addition reaction-type silicone material-added with the adhesion promoter—which was of the formula of No. 16 in Table 3—was added dropwise to the inside of the edge-dam, and the silicone-base material was cured under conditions of 100° C. and 1 hour to form a second protective resin layer. An optical circuit board of 1.6 mm in thickness was thus fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit-board was free of the potential breakage problem by deformations such as bending.

An optical loss of all the interconnected optical fibers was measured. It was found to be 0.5 dB or less including losses due to the interconnections with the optical connectors. With respect to optical circuit board so fabricated, a damp heat test (it was left over for 5,000 hours at 75° C. and 90%RH) and a heat cyclic test (−40 to 75° C., 500 cycles) were conducted. Variations and fluctuations in optical loss were both 0.3 dB or less. The optical circuit board was therefore found to be satisfactorily usable as an optical interconnection apparatus.

Example 20

A first protective resin layer was formed in a similar manner as in Example 19 except that a coating material—which was of the formula of No. 9 in Table 3, was composed of the addition reaction-type silicone material added with the adhesion promoter—was used instead of the silicone-base material in Example 19 and was cured at 100 for 1 hour.

Next, the silicone-base release film was peeled off, and on the exposed pressure-sensitive adhesive layer on its back side, optical fibers were routed such that each port was composed of 8 optical fibers, the total number of the optical fibers was 64 and the maximum number of overlapping optical fibers was limited to 2.

On the pressure-sensitive adhesive layer with the optical fibers routed thereon, a second protective resin layer was then formed. Described specifically, on and along peripheral edge portions of the pressure-sensitive adhesive layer on the back side, a silicone-base filling compound (product of KONISHI CO., LTD., "BATH BOND") was coated to form an edge-dam of 1.5 mm in width and 500 µm in height. A second protective resin layer was then formed inside the edge-dam by using a coating, material—which was of the formula of No. 9 in Table 3, was composed of the addition reaction-type silicone material added with the adhesion promoter—and curing it under conditions of 100° C. and 1 hour. An optical circuit board of 1.6 mm in thickness was thus fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.7 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.4 dB or less. The optical circuit board was therefore found to be satisfactorily usable as an optical interconnection apparatus.

Example 21

In a similar manner as in Example 15, two 125-µm thick polyimide films with optical fibers routed on pressure-sensitive adhesive layers thereof were prepared.

On and along peripheral-edge portions of one of the polyimide films, a silicone rubber coating material (product of Shin-Etsu Chemical Co., Ltd., "KE45-T") was coated to form an edge-dam of 2.5 m in width and 2 mm in width. A coating material—which was of the formula of No. 4 in Table 3, was composed of the addition reaction-type silicone material added with the adhesion promoter—was added dropwise to the inside of the edge-dam, and then, the other polyimide film with the optical fibers routed thereon was downwardly covered. The silicone rubber was cured under conditions of 100° C. and 1 hour to form a protective resin layer such that the optical fibers were held in place by the protective resin layer. An optical circuit board of 2.45 mm in thickness was thus fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.8 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.6 dB or less. The optical circuit board was therefore found to be satisfactorily usable as an optical interconnection apparatus.

Example 22

In a similar manner as in Example 21, an optical interconnection apparatus was fabricated. On and along peripheral edge portions on the back sides of the respective polyimide films, a silicone rubber coating material (product of Shin-Etsu Chemical Co., Ltd., "KE45-T") was coated to form edge-dams of 1.5 mm in width and 500 µm in height. An addition reaction-type silicone material added with the adhesion promoter—which was of the formula of No. 15 in Table 3—was added dropwise to the insides of the edge-dams, and was then cured under conditions of 100° C. and 1 hour to form second and third protective resin layers, whereby an optical circuit board of 3.45 mm in thickness was fabricated. MU connectors were then attached on the outwardly-extended ends of the optical fibers to obtain an optical circuit board as a final product.

In the optical circuit board so fabricated, the adhesion between the acrylic pressure-sensitive adhesive and the protective resin layer was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.6 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.4 dB or less. The optical circuit board was therefore found to be satisfactorily usable as an optical interconnection apparatus.

Example 23

Provided was an addition reaction-type silicone-base pressure-sensitive adhesive coating material composed of SD4590/BY24-741/SRX212/toluene (=100/1.0/0.9/50 (parts by weight))(all, products of Dow Corning Toray Silicone Co., Ltd.) (an addition reaction-type silicone-base pressure-sensitive adhesive composed of "SD4590" as a principal component and "BY24-741" and SRX212" as curing agents). The addition reaction-type silicone-base pressure-sensitive adhesive coating material was coated on one side of a 125-µm thick polyimide film to give a dry coat thickness of 100 µm. The resulting addition reaction-type silicone-base pressure-sensitive adhesive layer was then formed into a coating, whereby a sheet (size: 210 mm×297 mm) was prepared. On the sheet, optical fibers (product of The Furukawa Electric Co., Ltd., carbon-coated optical fibers, 250 µm in diameter) were routed per port (where optical fibers were to extend out of an optical interconnection apparatus) as will be described next. Namely, 16 optical fibers were arranged in parallel with each other at pitches of 300 µm, and 8 ports (each port was formed of 16 optical fibers) were formed at pitches of 25 mm on each of opposite sides, i.e., shorter sides of the polyimide film. Each optical fiber was routed extending from one of the shorter sides of the polyimide film to the other shorter side. The routing to the individual ports on the opposite sides was designed to provide each of the optical fibers with desired free-access routing (128 fibers), and the routing of the optical fibers was adjusted to limit the maximum number of overlapping optical fibers at 3 fibers.

On and along peripheral edge portions of the polyimide film with the optical fibers routed thereon, a silicone-base filling compound (product of KONISHI CO., LTD., "BATH BOND") was then coated to form an edge-dam of 1.5 mm in width and 1 mm in thickness. A silicone gel coating material (product of Dow Corning Toray Silicone Co., Ltd., "SE-1880") was thereafter added dropwise to the inside of the edge-dam, and the silicone gel was cured under conditions of 120° C. and 1 hour to form a protective resin layer such that the optical fibers were held by the protective resin layer. An optical circuit board of 1.2 mm in thickness was thus fabricated. MU connectors were then attached on the outwardly-extended ends of the optical fibers to obtain an optical circuit board as a final product.

In the optical circuit board so fabricated, the adhesion between the addition reaction-type silicone-base pressure-sensitive adhesive and the protective resin layer formed from the silicone gel was good, the optical fibers were firmly held in place, and the optical fibers in the routing pattern was free of displacements (a loss in the intactness of the routing pattern). The optical circuit board was free of the potential breakage problem by deformations such as bending.

An optical loss of all the interconnected optical fibers was measured. It was found to be 0.4 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.2 dB or less. The optical circuit board was therefore found to be satisfactorily usable as an optical interconnection apparatus.

Example 24

In Example 23, a base film (size: 210 mm×297 mm) was provided by coating a 125-µm thick polyimide film on both sides thereof with an addition reaction-type silicone-base pressure-sensitive adhesive, which was the same as that employed in Example 23, to a thickness of 100 µm and adhering a release film onto one side of the polyimide film. In a similar manner as in Example 23, optical fibers were routed on the other side of the polyimide film. Using a silicone rubber coating material (product of Shin-Etsu Chemical Co., Ltd. "KE45-T") instead of the silicone-base filling compound, an edge-dam of 1.5 mm in width and 1 mm in height was then formed along the peripheral edges of the polyimide film. A silicone rubber coating material (product of Toshiba silicone Co., Ltd., "TSE3991") was added dropwise to the inside of the edge-dam and then, the silicone-base material was cured under conditions of 25° C. and 24 hours to form a first protective resin layer, whereby the optical fibers were held in place in an embedded form.

Thereafter, the release film which was located on the back side of the polyimide film was peeled off, and on the adhesive layer, routing of 64 free-access optical fibers was conducted such that the total number of the optical fibers was 64 and the maximum number of overlapping optical fibers was limited to 2. Using a silicone rubber coating material (product of Shin-Etsu Chemical Co., Ltd., "KE45-T"), another edge-dam of 1.5 mm in width and 500 µm in height was then formed along peripheral edge portions of the polyimide film on which the optical fibers had been routed.

A silicone rubber coating material (product of Toshiba Silicone Co., Ltd., "TSE389") was next added dropwise to the inside of the edge-dam and then, the silicone rubber was cured under conditions of 25° C. and 24 hours to form a second protective resin layer, whereby the optical fibers were held in place in an embedded form. Accordingly, an optical circuit board of 1.8 mm in thickness was fabricated. MU connectors were then attached on the outwardly-extended ends of the optical fibers to obtain an optical circuit board.

In the optical circuit board so fabricated, the adhesion between the addition reaction-type silicone-base pressure-sensitive adhesive and the protective resin layer formed from the silicone rubber was good, the optical fibers were firmly held in place, and the optical fibers in the routing pattern was free of displacements (a loss in the intactness of the routing pattern). Owing to the arrangement of the protective resin layers, which had been formed from the silicone rubber, on both the sides of the polyimide film, respectively, the optical circuit board was provided with increased flexibility and was free of the potential breakage problem by deformations such as bending.

An optical loss of all the interconnected optical fibers was measured. It was found to be 0.4 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.1 dB or less. The optical circuit board was therefore found to be satisfactorily usable as an optical interconnection apparatus.

Example 25

Two optical interconnection apparatuses were fabricated in a similar manner as in Example 24 except that an addition reaction-type silicone-base pressure-sensitive adhesive coating material composed of SD4592/BY24-741/SRX212/toluene (=100/1.0/0.9/50 (parts by weight))(all, products of Dow Corning Toray Silicone Co., Ltd.)(an addition reaction-type silicone-base pressure-sensitive adhesive composed of "SD4592" as a principal component) was used instead of the addition reaction-type silicone-base pressure-sensitive adhesive coating material in Example 24.

On the second protective resin layer of one of the optical interconnection apparatuses, an addition reaction-type silicone-base pressure-sensitive adhesive coating material [product of Dow Corning Toray Silicone Co., Ltd., SD4592/BY24-741/SRX212/toluene=100/1.0/0.9/50 (parts by weight)] was next coated by dispenser coating to form an adhesive layer such that its dry thickness became 100 μm. The other optical interconnection apparatus was stacked on and adhered to the adhesive layer, whereby an optical circuit board of a stacked structure of 3.7 mm in thickness was fabricated.

In the optical circuit board so fabricated, the adhesion between the addition reaction-type silicone-base pressure-sensitive adhesive and the protective resin layer formed from the silicone rubber was good, the optical fibers were firmly held in place, and the optical fibers in the routing pattern was free of displacements (a loss in the intactness of the routing pattern). Owing to the arrangement of the protective resin layers, which had been formed from the silicone rubber, on both the sides of the polyimide film, respectively, the optical circuit board was provided with increased flexibility and was free of the potential breakage problem by deformations such as bending.

An optical loss of all the interconnected optical fibers was measured. It was found to be 0.3 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.15 dB or less. The optical circuit board was therefore found to be satisfactorily usable as an optical interconnection apparatus.

Example 26

In a similar manner as in Example 23, two 125-μm thick polyimide films with optical fibers routed on pressure-sensitive adhesive layers formed of an addition reaction-type silicone pressure-sensitive adhesive (product of Dow Corning Toray Silicone Co., Ltd., SD4590/BY24-741, "SRX212") were prepared.

On and along peripheral edge portions of one of the polyimide films, a silicone rubber coating material (product of Shin-Etsu Chemical Co., Ltd., "KE45-T") was coated to form an edge-dam of 2.5 mm in width and 2 mm in height. A silicone rubber coating material (product of Dow Corning Toray Silicone Co., Ltd., "SE9176L") was added dropwise to the inside of the edge-dam, and then, the other polyimide film with the optical fibers routed thereon was downwardly covered. The silicone rubber was cured under conditions of 25° C. and 24 hours. On and along peripheral edge portions on the back sides of the respective polyimide films, a silicone rubber coating material (product of Shin-Etsu Chemical Co., Ltd., "KE45-T") was coated to form edge-dams of 1.5 mm in width and 500 μm in height. A silicone rubber coating material (product of Dow Corning Toray Silicone Co., Ltd., "SE1701") was added dropwise to the insides of the edge-dams and was then cured under conditions of 120° C. and 30 minutes to form second and third protective resin layers, whereby an optical circuit board of 3.45 mm in thickness was fabricated. MU connectors were then attached on the outwardly-extended ends of the optical fibers to obtain an optical circuit board as a final product.

In the optical circuit board so fabricated, the adhesion between the addition reaction-type silicone-base pressure-sensitive adhesive and the protective resin layer formed from the silicone rubber was good, the optical fibers were firmly held in place, and the optical fibers in the routing pattern was free of displacements (a loss in the intactness of the routing pattern). Owing to the arrangement of the protective resin layers, which had been formed from the silicone rubber, on both the sides of the polyimide film, respectively, the optical interconnection apparatus was provided with increased flexibility and was free of the potential breakage problem by deformations such as bending.

An optical loss of all the interconnected optical fibers was measured. It was found to be 0.4 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.2 dB or less. The optical circuit board was therefore found to be satisfactorily usable as an optical interconnection apparatus.

Example 27

The same addition reaction-type silicone pressure-sensitive adhesive coating material (product of Dow Corning Toray Silicone Co., Ltd., SD4592/BY24-741/SRX212) as that employed in Example 25 was coated on one side of a 75-μm thick silicone-base release film to give a dry coat thickness of 100 μm, whereby an addition reaction-type silicone-base pressure-sensitive adhesive layer was formed and a sheet (size: 210 mm×297 mm) was prepared. Optical fibers were routed on the sheet in a similar manner as in Example 23. On and along peripheral edge portions of the release film with the optical fibers routed thereon, an edge-dam of a silicone-base filling compound (product of KONISHI CO., LTD., "BATH BOND") was formed in a similar manner as in Example 23. Inside the edge-dam, a first protective resin layer was formed using a silicone rubber coating material (product of Shin-Etsu Chemical Co., Ltd., "KE109") and curing the silicone rubber under conditions of 150° C. and 30 minutes.

Next, the silicone-base release film was peeled off, and on the exposed pressure-sensitive adhesive layer on its back side, a-second protective resin layer was formed. Described specifically, on and along peripheral edge portions of the pressure-sensitive adhesive layer on the back side, a silicone-base filling compound (product of KONISHI CO., LTD., "BATH BOND") was coated to form an edge-dam of 1.5 mm in width and 500 μm in height. Inside the edge-dam, the second protective resin layer was formed using a silicone rubber coating material (product of Shin-Etsu Chemical Co., Ltd., "KE109") and curing the silicone rubber under conditions of 150° C. and 30 minutes. An optical circuit board of 1.6 mm in thickness was thus fabricated. MU connectors were then attached on the outwardly-extended ends of the optical fibers to obtain an optical circuit board as a final product.

In the optical circuit board so fabricated, the adhesion between the addition reaction-type silicone-base pressure-sensitive adhesive and the protective resin layer formed from the silicone rubber was good, the optical fibers were firmly held in place, and the optical fibers in the routing pattern was free of displacements (a loss in the intactness of the routing pattern). As the protective resin layers formed from the silicone rubber were simply joined together via the addition reaction-type silicone-base pressure-sensitive adhesive layer and no base is included, the optical circuit board was provided with further increased flexibility and was free of the potential breakage problem by deformations such as bending.

An optical loss of all the interconnected optical fibers was measured. It was found to be 0.3 dB or less including losses due to the interconnections with the optical connectors. With respect to optical circuit board so fabricated, a damp heat test (it was left over for 5,000 hours at 75° C. and 90%RH) and a heat cyclic test (−40° C. to 75° C., 500 cycles) were conducted. Variations and fluctuations in optical loss were both 0.2 dB or less. The optical circuit board was therefore found to be satisfactorily usable as an optical interconnection apparatus.

Example 28

A first protective resin layer was formed in a similar manner as in Example 27 except that a silicone rubber coating material (product of Toshiba Silicone Co., Ltd., "TSE3033") was used instead of the silicone-base material in Example 27 and was cured at 150° C. for 30 minutes.

Next, the silicone-base release film was peeled off, and on the exposed pressure-sensitive adhesive layer on its back side, optical fibers were routed such that each port was composed of 8 optical fibers, the total number of the optical fibers was 64 and the maximum number of overlapping optical fibers was limited to 2.

On the pressure-sensitive adhesive layer with the optical fibers routed thereon, a second protective resin layer was then formed. Described specifically, on and along peripheral edge portions of the pressure-sensitive adhesive layer on the back side, a silicone-base filling compound (product of KONISHI CO., LTD., "BATH BOND") was coated to form an edge-dam of 1.5 mm in width and 500 μm in height. A second protective resin layer was then formed inside the edge-dam by using a silicone rubber coating material (product of Toshiba Silicone Co., Ltd., "TSE3033") and curing it under conditions of 150° C. and 30 minutes. An optical circuit board of 1.6 mm in thickness was thus fabricated. MU connectors were then attached on the outwardly-extended ends of the optical fibers to obtain an optical circuit board as a final product.

In the optical circuit board so fabricated, the adhesion between the addition reaction-type silicone-base pressure-sensitive adhesive and the protective resin layer formed from the silicone rubber was good, the optical fibers were firmly held in place, and the optical fibers in the routing pattern was free of displacements (a loss in the intactness of the routing pattern). As the protective resin layers formed from the silicone rubber were simply joined together via the addition reaction-type silicone-base pressure-sensitive adhesive layer and no base is included, the optical circuit board was provided with further increased flexibility and was free of the potential breakage problem by deformations such as bending.

An optical loss of all the interconnected optical fibers was measured. It was found to be 0.4 dB or less including losses due to the interconnections with the optical connectors. With respect to optical circuit board so fabricated, a damp heat test (it was left over for 5,000 hours at 75' and 90%RH) and a heat cyclic test (−40° C. to 75° C., 500 cycles) were conducted. Variations and fluctuations in optical loss were both 0.15 dB or less. The optical circuit board was therefore found to be satisfactorily usable as an optical interconnection apparatus.

Capability of Exploitation In Industry

As the optical interconnection apparatus according to the present invention can hold in place and protect routed optical fibers against external force (pulling, bending, scratching and the like) and permits easy optical interconnections without a loss in the intactness of a routing pattern of the optical fibers routed overlapping one another, they are useful for mutually connecting optical elements, components and/or devices used in optical communications or optical information processing, such as optical elements, optical circuit packages and optical circuit devices.

What is claimed is:

1. An optical interconnection apparatus having plural optical fibers, which are routed in a two-dimensional plane and are provided at opposite ends thereof with end portions adapted to permit optical interconnections thereto, and at least one protective resin layer by which said optical fibers are held in place in a form embedded therein characterized in that said protective resin layer is formed from a silicone-base material curable through a condensation reaction with liberation of an oxime or liberation of an alcohol, is joined with a base or another protective resin layer via an adhesive layer, and said adhesive layer comprises an acrylic pressure-sensitive adhesive.

2. An optical interconnection apparatus according to claim 1, wherein protective resin layers by which optical fibers are held in place, respectively, are joined to opposite sides of said base via adhesive layers, respectively.

3. An optical interconnection apparatus according to claim 1, wherein plural protective resin layers by which optical fibers are held in place, respectively, are joined together via said adhesive layer.

4. An optical interconnection apparatus characterized in that plural optical interconnection apparatuses as defined in claim 1 are joined together via an adhesive layer formed of a silicone-base pressure-sensitive adhesive, whereby a stacked structure is formed.

5. An optical interconnection apparatus according to claim 1, wherein said protective resin layer comprises an adhesion promoter.

6. An optical interconnection apparatus according to claim 5, wherein said adhesion promoter is a compound represented by the following formula (I):

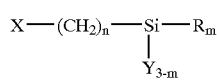
(I)

wherein X represents a chlorine atom, vinyl group, methacryl group epoxy group, amino group or mercapto group, R represents a halogen atom or an alkoxy group having 1 to 4 carbon atoms, Y represents a hydrocarbon group having 1 to 4 carbon atoms, n stands for an integer of from 1 to 10, and m stands for an integer of from 1 to 3.

7. An optical interconnection apparatus having plural optical fibers, which are routed in a two-dimensional plane and are provided at opposite ends thereof with end portions adapted to permit optical interconnections thereto, and at least one protective resin layer by which said optical fibers are held in place, characterized in that said protective resin layer is formed from a silicone-base material curable by crosslinking through a hydrosilation reaction and an adhesion promoter, is joined with a base or another protective resin layer via an adhesive layer, and said adhesive layer comprises an acrylic pressures sensitive adhesive.

8. An optical interconnection apparatus according to claim 7, wherein said adhesion promoter is a silane coupling agent represented by the following formula (II):

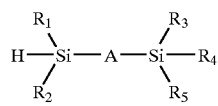
(II)

wherein A represents a substituted or unsubstituted hydrocarbon chain, $R_1$ and $R_2$ may be the same or different and represent a hydrogen atom or a substituted or unsubstituted alkyl group, and $R_3$, $R_4$ and $R_5$ may be the same or different and represent at least one substituent selected from the group consisting of alkyl groups, alkoxy groups, alkoxy groups of the alkyl ether structure and a chlorine atom with a proviso that one of $R_3$, $R_4$ and $R_5$ is an alkoxy group of the alkyl ether structure.

9. An optical interconnection apparatus according to claim 7, when said adhesion promoter comprises a hydrogenpolysiloxane and a silane coupling agent represented by the following formula (II):

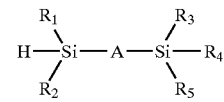
(II)

wherein A represents a substituted or unsubstituted hydrocarbon chain, $R_1$ and $R_2$ may be the same or different and represent a hydrogen atom or a substituted or unsubstituted alkyl group, and $R_3$, $R_4$ and $R_5$ may be the same or different and represent at least one substituent selected firm the group consisting of alkyl groups, alkoxy groups, alkoxy groups of the alkyl ether structure and a chlorine atom with a proviso that one of $R_3$, $R_4$ and $R_5$ is an alkoxy group or an alkoxy group of the alkyl ether structure.

10. An optical interconnection apparatus according to claim 7, wherein protective resin layers by which optical fibers are held in place, respectively, are joined to opposite sides of said base via adhesive layers, respectively.

11. An optical interconnection apparatus according to claim 7, wherein plural protective resin layers by which optical fibers are held in place, respectively, are joined together via said adhesive layer.

12. An optical interconnection apparatus characterized in that plural optical interconnection apparatuses as defined in claim 7 are joined together via an adhesive layer formed of a silicone-base pressure-sensitive adhesive, whereby a stacked structure is formed.

13. An optical interconnection apparatus having plural optical fibers, which are routed in a two-dimensional plane and are provided at opposite ends thereof with end portions adapted to permit optical interconnections thereto, and at least one protective resin layer by which said optical fibers are held in place, characterized n that said protective resin layer is formed of a silicone-base material, is joined with a base or another protective resin layer via an adhesive layer, and said adhesive layer comprises a silicone-base pressure-sensitive adhesive curable by crosslinking through a hydrosilation reaction.

14. An optical interconnection apparatus according to claim 13, wherein said protective resin layer has been formed by filling a silicone-base material inside an edge dam member arranged along or in a vicinity of a peripheral edge of said base or said another protective resin layer.

15. An optical interconnection apparatus according to claim 13, wherein said protective resin layer is formed of a gel-form or rubbery silicone-base material.

16. An optical interconnection apparatus according to claim 13, wherein protective resin layers by which optical fibers are held in place, respectively, are joined to opposite sides of said base via adhesive layers, respectively.

17. An optical interconnection apparatus according to claim 13, wherein plural protective resin layers by which optical fibers are held in place, respectively, are joined together via said adhesive layer.

18. An optical interconnection apparatus characterized in that plural optical interconnection apparatuses as defined in claim 13 are joined together via an adhesive layer formed from a silicone-base pressure-sensitive adhesive curable by crosslinking through a hydrosilation reaction, whereby a stacked structure is formed.

* * * * *